US012718786B2

(12) United States Patent
Kim et al.

(10) Patent No.: US 12,718,786 B2
(45) Date of Patent: Aug. 25, 2026

(54) ACOUSTIC MATCHING MEMBER, MANUFACTURING METHOD THEREOF AND ULTRASOUND DEVICE INCLUDING THE SAME

(71) Applicant: Seoul National University R&DB foundation, Seoul (KR)

(72) Inventors: Gihyun Kim, Seoul (KR); Jeseung Lee, Gyeonggi-do (KR); Yoon Young Kim, Seoul (KR)

(73) Assignee: Seoul National University R&DB foundation, Seoul (KR)

( * ) Notice: Subject to any disclaimer, the term of this patent is extended or adjusted under 35 U.S.C. 154(b) by 203 days.

(21) Appl. No.: 18/278,164

(22) PCT Filed: Jul. 11, 2023

(86) PCT No.: PCT/KR2023/009812
§ 371 (c)(1),
(2) Date: Aug. 21, 2023

(87) PCT Pub. No.: WO2024/210266
PCT Pub. Date: Oct. 10, 2024

(65) Prior Publication Data

US 2025/0037689 A1 Jan. 30, 2025

(30) Foreign Application Priority Data

Apr. 6, 2023 (KR) ........................ 10-2023-0045251

(51) Int. Cl.
*G10K 11/02* (2006.01)
*B06B 1/02* (2006.01)

(52) U.S. Cl.
CPC ............ *G10K 11/02* (2013.01); *B06B 1/0207* (2013.01); *B06B 2201/40* (2013.01); *B06B 2201/76* (2013.01)

(58) Field of Classification Search
None
See application file for complete search history.

(56) References Cited

U.S. PATENT DOCUMENTS

| | | | | |
|---|---|---|---|---|
| 2003/0060708 A1* | 3/2003 | Ogawa | G01S 15/8968 | 600/437 |
| 2009/0082673 A1* | 3/2009 | Lu | B06B 1/0292 | 600/459 |

(Continued)

FOREIGN PATENT DOCUMENTS

| | | |
|---|---|---|
| JP | 2006-101204 | 4/2006 |
| JP | 2017-170713 | 9/2017 |

(Continued)

OTHER PUBLICATIONS

Craig, Steven R., Phoebe J. Welch, and Chengzhi Shi. "Non-Hermitian complementary acoustic metamaterials for imaging through skull with imperfections." Frontiers in Mechanical Engineering 6 (2020): 55. (Year: 2020).*

(Continued)

*Primary Examiner* — Jonathan D Armstrong

(57) ABSTRACT

Disclosed is an acoustic matching member comprising matching pattern to determine an impedance of the acoustic matching member and a phase change of the acoustic matching member defined as the product of a wave number and thickness of the acoustic matching member, which satisfies the impedance and the phase change matching conditions so that 90% or more of an ultrasound may be transmitted through a barrier located between an incident medium and a target medium.

14 Claims, 23 Drawing Sheets

(56) References Cited

U.S. PATENT DOCUMENTS

| | | | | |
|---|---|---|---|---|
| 2009/0182237 | A1* | 7/2009 | Angelsen | B06B 1/064 600/459 |
| 2013/0195333 | A1* | 8/2013 | Singh | G03F 7/0035 310/334 |
| 2020/0348431 | A1* | 11/2020 | Lee | G01V 1/284 |
| 2021/0119606 | A1* | 4/2021 | Lu | H03H 9/02559 |
| 2023/0054652 | A1* | 2/2023 | Lee | G01N 29/28 |

FOREIGN PATENT DOCUMENTS

| | | |
|---|---|---|
| KR | 10-2017-0117462 | 10/2017 |
| KR | 10-2020-0127847 | 11/2020 |
| KR | 10-2023-0026804 | 2/2023 |

OTHER PUBLICATIONS

Craig, Steven R., et al. "Extreme material parameters accessible by active acoustic metamaterials with Willis coupling." The Journal of the Acoustical Society of America 151.3 (2022): 1722-1729. (Year: 2022).*

Krishna, Arvind, et al. "Inverse design of acoustic metasurfaces using space-filling points." Applied Physics Letters 121.7 (2022). (Year: 2022).*

International Search Report mailed Dec. 29, 2023 for PCT/KR2023/009812.

* cited by examiner

*FIG. 1D*

4×4 scattering matrix $$\begin{bmatrix} t_l e^{-ik_l d} \\ 0 \\ t_s e^{-ik_s d} \\ 0 \end{bmatrix} = \begin{bmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{bmatrix} \begin{bmatrix} 1 \\ r_l \\ 0 \\ r_s \end{bmatrix} = \mathbb{S} \cdot \begin{bmatrix} 1 \\ r_l \\ 0 \\ r_s \end{bmatrix},$$

A transmission coefficient of a longitudinal wave

A transmission coefficient of a transverse wave(conversion)

A case that a longitudinal wave is entering is considered.

A reflection coefficient of a longitudinal wave

A reflection coefficient of a transverse(conversion) wave

R(reflection) < 0.1

FIG. 8

| Barrier Material | Barrier Thickness | Layer Thickness | Layer Impedance [kg/(m²·s)] | Layer Phase [rad] | Transmittance |
|---|---|---|---|---|---|
| Aluminium | 10mm | 10mm | $6.84383*10^6$ | 2.30335 | 100% |
| Lead | 10mm | 10mm | $5.4195*10^6$ | 0.539901 | 100% |
| Glass | 10mm | 10mm | $6.15295*10^6$ | 2.23372 | 100% |
| Skull Bone | 10mm | 10mm | $4.59107*10^6$ | 1.62687 | 100% |
| Copper | 10mm | 10mm | $5.66679*10^7$ | 1.39312 | 100% |

ACOUSTIC MATCHING MEMBER, MANUFACTURING METHOD THEREOF AND ULTRASOUND DEVICE INCLUDING THE SAME

This application claims the priority of Korean Patent Application No. 10-2023-0045251, filed on Apr. 6, 2023 in the KIPO (Korean Intellectual Property Office), the disclosure of which is incorporated herein entirely by reference. Further, this application is the National Stage application of International Application No. PCT/KR2023/009812, filed on Jul. 11, 2023, which designates the United States and was published in Korean. Each of these applications is hereby incorporated by reference in their entirety into the present application.

TECHNICAL FIELD

The present invention relates to an impedance matching technology, particularly an acoustic matching member with a barrier penetrating function, a manufacturing method, and an ultrasound device, including the acoustic matching member.

BACKGROUND ART

A vibrating body generating sound is called an acoustic source, and sound energy generated from the sound source is transmitted in the form of a wave having a constant frequency. The frequency of sound which a human being may hear (hereinafter, referred to as audible frequency) is 20-20,000 Hz. The sound waves having a high frequency above the audible frequency range are referred to as ultrasound. Ultrasonography is a method for transmitting pulse waves into tissues of a human body with different acoustic impedances, amplifying and converting the reflected signals with a computer, and displaying them as images. It is also called sonography or sonogram.

When ultrasound propagate from a first medium to another second medium, a reflection phenomenon inevitably occurs at a boundary between the first medium and the second medium. This is due to an impedance mismatch between the two media. Conventionally, an impedance matching technique has been used to increase transmittance of ultrasound at interface between different media. The impedance matching technology is a technology which increases ultrasound transmittance by inserting an engineered impedance matching layer at the interface between different media. However, the conventional impedance matching technique has a limitation that it may not be applied when there is another barrier between the incident medium and the target medium.

In addition, when there is a significant barrier which causes an impedance mismatch in the path of the ultrasound, only a small amount of energy is transmitted because a large amount of reflected waves are generated from the barrier. For example, when ultrasound waves are propagated to the brain for brain imaging and treatment since most of the propagating ultrasound waves are reflected from the skull existing at the front end of the brain, the energy of the ultrasound waves transmitted to the brain is very small.

Conventionally, research on a complementary meta-material that implements negative physical properties by using a mass-spring system and overcomes barriers is in progress, but commercialization is difficult due to limitations in processing precision.

Therefore, there is a need for an acoustic matching technology which is easy to manufacture, has a simple structure, and is designed to penetrate barriers fully.

DISCLOSURE OF THE INVENTION

Technical Problem

An object of the present invention is to provide an acoustic matching member that is easy to manufacture, has a simple structure, and is designed to fully penetrate a barrier and a manufacturing method.

In addition, a technological object to be achieved by the present invention is to provide an ultrasound device that propagates ultrasound to a target to be measured by minimizing energy loss due to a barrier existing between an incident medium and a target medium.

The object to be solved by the present invention is not limited to the objects mentioned above, and other objects not mentioned will be understood by those skilled in the art from the description below.

Technical Solution

According to an embodiment of the present invention, an acoustic matching member which satisfies the impedance and the phase change matching conditions so that 90% or more of the ultrasound may be transmitted through a barrier located between the incident medium and the target medium may include a matching pattern to determine the impedance and the phase changes of the acoustic matching member. The matching pattern has a form in which unit structures including a single X-shaped pattern are arranged. The impedance and the phase change of the acoustic matching member are determined by at least one design variable of the matching pattern, and the design variable may include a horizontal length and a vertical length of the unit structure, and a length, radius, and rotation angle of the X-shaped pattern. The impedance matching condition is defined by the following equation.

$$Z_L = Z_B\sqrt{\frac{+\cos(d_Bk_B)^2Z_IZ_T^2-\cos(d_Bk_B)^2Z_I^2Z_T-\sin(d_Bk_B)^2Z_I^2Z_T+\sin(d_Bk_B)^2Z_IZ_B^2}{-\cos(d_Bk_B)^2Z_IZ_B^2+\cos(d_Bk_B)^2Z_B^2Z_T+\sin(d_Bk_B)^2Z_B^2Z_T-\sin(d_Bk_B)^2Z_IZ_T^2}}$$

The phase change matching condition may be defined by the following equation.

$$d_Lk_L = \pm\arccos\left(\frac{\pm\sin(2d_Bk_B)\sqrt{Z_I}\left(Z_B^2-Z_T^2\right)}{2\sqrt{Z_T\left(\sin(d_Bk_B)^2Z_B^4-2Z_IZ_B^2Z_T+\cos(d_Bk_B)^2Z_B^2Z_T^2+Z_I^2\left(\cos(d_Bk_B)^2Z_B^2+\sin(d_Bk_B)^2Z_T^2\right)\right)}}\right)$$

Here, $Z_1$ is the impedance of the incident medium, $Z_T$ is the impedance of the target medium, $Z_B$ is the impedance of the barrier, $Z_L$ is the impedance of the acoustic matching member, $k_B$ is the wave number of the barrier, $k_L$ is the wave number of the acoustic matching member, $d_B$ is the thickness of the barrier, and $d_B$ is the thickness of the acoustic matching member.

The impedance and the phase change matching conditions are based on the destructive interference conditions of reflected waves generated by multiple internal reflections occurring inside the acoustic matching member and the barrier. The first region of the matching pattern and the second region other than the matching pattern may have different media or different thicknesses. The acoustic matching member may be positioned between the incident medium and the barrier. The acoustic matching member includes a resin component, and the resin component may include a polyimide resin, an epoxy resin, a glass fiber-reinforced epoxy resin, or a thermoplastic resin. The acoustic matching member may be used in ultrasound treatment devices, diagnostic devices, imaging devices, and industrial ultrasound non-destructive testing equipment.

According to another embodiment of the present invention, there is provided a manufacturing method for acoustic matching member comprising: a step for preparing an acoustic matching member without a pattern by using a first material; and a step for forming a matching pattern on the acoustic matching member, and wherein the matching pattern determines an impedance and a phase change of the acoustic matching member. The first material includes a resin component, and the resin component may include a polyimide resin, an epoxy resin, a glass fiber-reinforced epoxy resin, or a thermoplastic resin. It includes a first region of the matching pattern and a second region other than the first region, and the first region and the second region have different media or different thicknesses. The matching pattern has an M×N array structure, where M and N are natural numbers greater than zero. The matching pattern has a structure in which unit structures including a single X-shaped pattern are arranged.

According to another embodiment of the present invention, an ultrasound treatment device operating in conjunction with an acoustic matching member may be provided.

According to another embodiment of the present invention, an ultrasound diagnostic device operating in conjunction with an acoustic matching member may be provided.

According to another embodiment of the present invention, an ultrasound non-destructive testing device operating in conjunction with an acoustic matching member may be provided.

Advantageous Effects

According to embodiments of the present invention, an acoustic matching member designed to penetrate a barrier fully may be provided by including a matching pattern for determining the impedance and phase change of the acoustic matching member.

In addition, it is possible to provide an ultrasound device that propagates ultrasound to an object to be measured by minimizing energy loss due to a barrier existing between an incident medium and a target medium.

In addition, it is possible to provide a manufacturing method of the acoustic matching member which is easy to manufacture and has a simple structure by forming the matching pattern of the acoustic matching member through mechanical processing.

However, the effects of the present invention are not limited to the above effects, and may be variously expanded without departing from the technological spirit and scope of the present invention.

BRIEF DESCRIPTION OF THE DRAWINGS

FIG. 1D is a diagram showing a scattering matrix for converting longitudinal and transverse waves into a state after scattering.

FIG. 8 is an FEM simulation result table with homogenized metamaterial matching layer's effective properties for full transmission in the FEM simulation environment of FIG. 7.

BEST MODE FOR CARRYING OUT THE INVENTION

Hereinafter, the embodiments of the present invention will be described in detail with reference to the accompanying drawings.

The embodiments of the present invention to be described below are provided to more clearly explain the present invention to those skilled in the art, and the scope of the present invention is not limited by the following embodiments, and the embodiments may be modified in many different forms.

The terms used in this specification are used to describe specific embodiments and are not intended to limit the present invention. The terms indicating a singular form used herein may include plural forms unless the context clearly indicates otherwise. Also, as used herein, the terms, "comprise" and/or "comprising" specify the presence of the stated shape, step, number, operation, member, element, and/or group thereof and does not exclude the presence or addition of one or more other shapes, steps, numbers, operations, elements, elements and/or groups thereof. In addition, the term, "connection" used in this specification means not only a direct connection of certain members, but also a concept including an indirect connection in which other members are interposed between the members.

In addition, in the present specification, when a member is said to be located "on" another member, this arrangement includes not only a case in which a member is in contact with another member, but also a case where another member exists between the two members. As used herein, the term, "and/or" includes any one and all combinations of one or more of the listed items. In addition, the terms of degree such as "about" and "substantially" used in the present specification are used as a range of values or degrees, or as a meaning close thereto, taking into account inherent manufacturing and material tolerances, and exact or absolute figures provided to aid in the understanding of this application are used to prevent the infringers from unfairly exploiting the stated disclosure.

Hereinafter, embodiments of the present invention will be described in detail with reference to the accompanying drawings. A size or a thickness of areas or parts shown in the accompanying drawings may be slightly exaggerated for clarity of the specification and convenience of description. The same reference numbers indicate the same configuring elements throughout the detailed description.

Figure 1A:
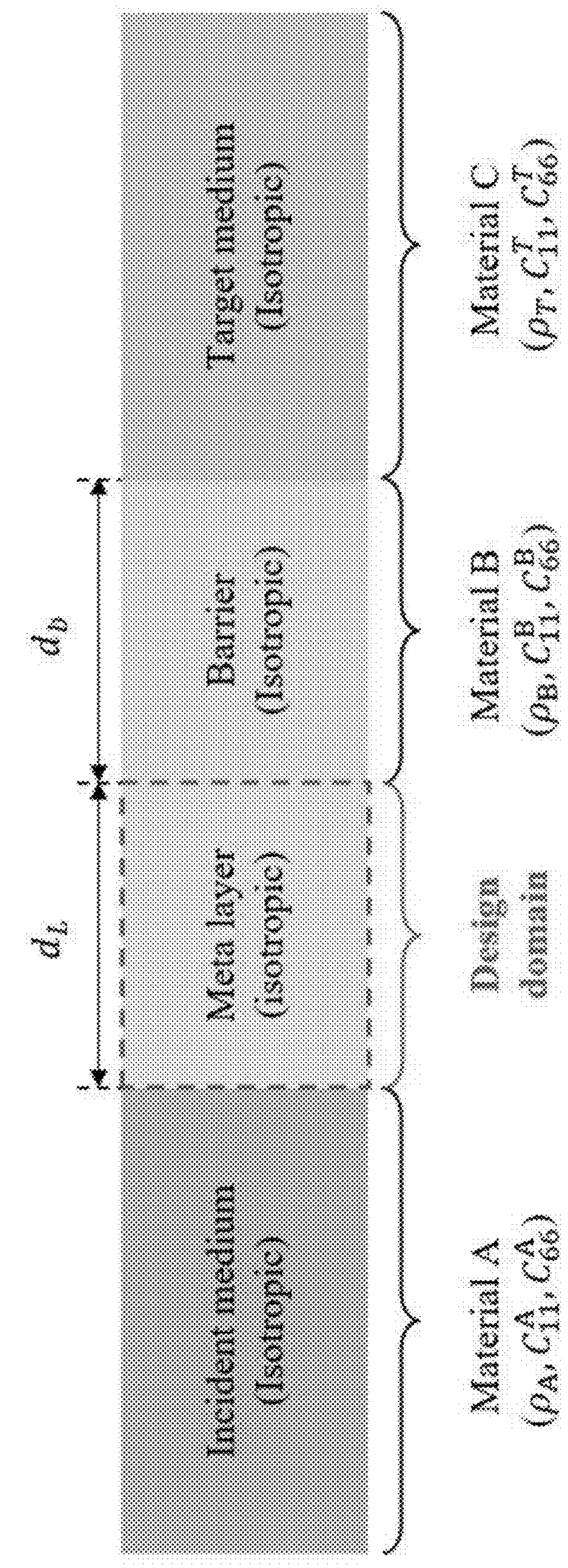
FIG. 1A is a diagram for explaining a barrier penetration design of an elastic wave including a sound wave according to an embodiment of the present invention.
Figure 1B:
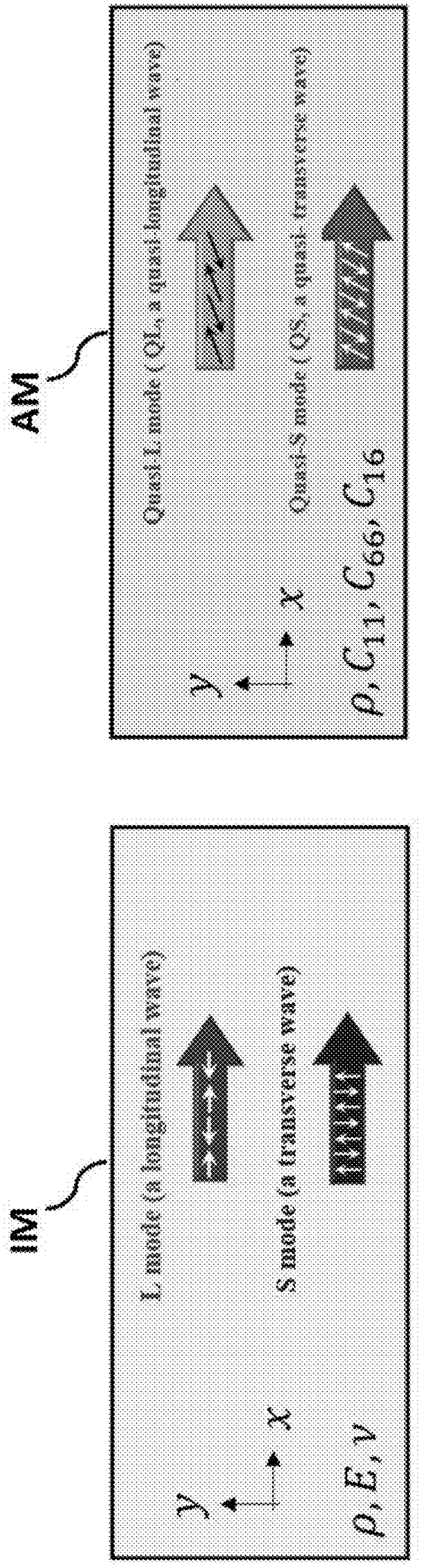
FIG. 1B is a diagram for explaining the type of elastic wave and the properties of the medium that determine its propagation characteristics.
Figure 1C:
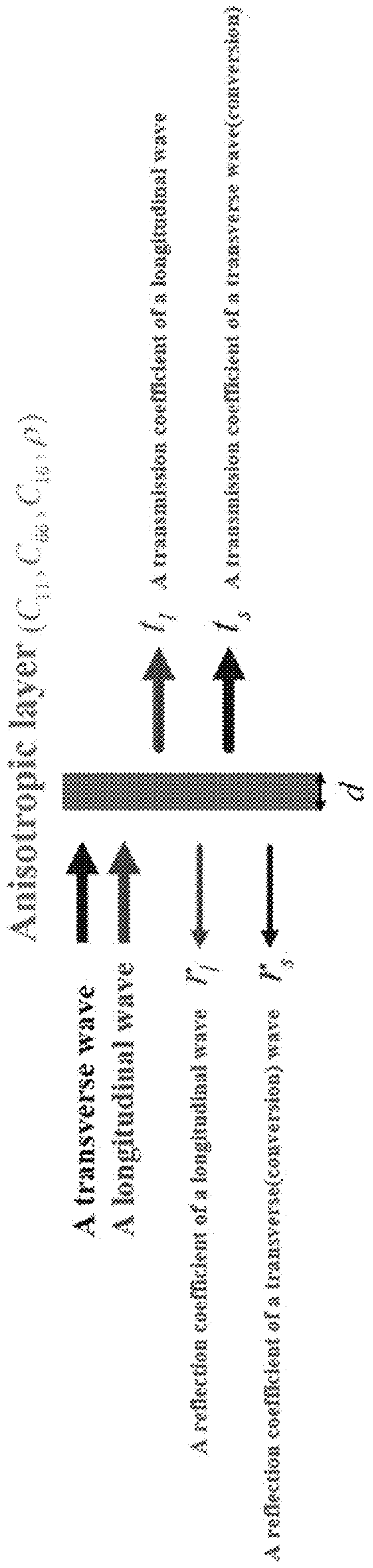
FIG. 1C is a diagram showing the relationship between the anisotropic layer transmittance of longitudinal and transverse waves.

FIG. 1A is a diagram for explaining a barrier penetration design of an elastic wave including a sound wave according to an embodiment of the present invention, FIG. 1B is a diagram for explaining the type of elastic wave and the properties of the medium that determine its propagation characteristics, FIG. 1C is a diagram showing the relationship between the anisotropic layer transmittance of longitudinal and transverse waves, and FIG. 1D is a diagram showing a scattering matrix for converting longitudinal and transverse waves into a state after scattering.

Referring to FIG. 1A, when an elastic wave including ultrasound is transmitted to a target medium composed of material C through an incident medium composed of material A, since a barrier made of material B may exist between the incident medium and the target medium having different media, and the elastic wave is reflected in whole or in part due to the barrier, the energy of the elastic wave may not be transferred or only partially transferred to the target medium.

The density of material A is referred to as $\rho_A$, the longitudinal stiffness is referred to as $$C_{11}^{A},$$

the shear stiffness is referred to as $$C_{66}^{A}.$$

The density of material B is denoted by $\rho_B$, longitudinal stiffness is denoted by $$C_{11}^{B},$$

shear stiffness is denoted by $$C_{66}^{B}.$$

The density of material C is denoted by $\rho_T$, and longitudinal stiffness is referred to as $$C_{11}^{T},$$

and shear stiffness is referred to as $$C_{66}^{T}.$$

$d_b$ is the thickness of the barrier, and $d_L$ is the thickness of the meta layer. The meta layer which is a design target, is a matching layer, and a material having density ($\rho_L$), longitudinal stiffness $$C_{11}^{L}$$

shear stiffness $$C_{66}^{L}$$

may be designed so that the elastic wave may pass through the barrier that exists between the incident medium and the target medium. $\rho_L$, $$C_{11}^{L},\ C_{66}^{L},$$

and thickness ($d_L$) of the meta layer may be designed by a scattering matrix to be described later.

As shown in FIG. 1B, when a longitudinal or transverse wave of normal incidence passes through an isotropic medium (IM), the longitudinal-shear stiffness $$C_{16}$$

due to the combination of the longitudinal and transverse waves is zero. At this time, the wave characteristics of the isotropic medium (IM) have physical property values of density (ρ), energy (E), and velocity (v). The propagation speed of the longitudinal wave is defined as $$\sqrt{\frac{C_{11}}{\rho}},$$

and the propagation speed of the transverse wave is defined as $$\sqrt{\frac{C_{66}}{\rho}}.$$

When a quasi-L mode (QL) or a quasi-transverse wave (Quasi-S mode, QS) passes through an anisotropic medium (AM), the anisotropic medium (AM) may be defined by a density (ρ), a longitudinal stiffness $$C_{11}$$

a shear stiffness $$C_{66}$$

and a longitudinal-shear stiffness $$C_{16}$$

and the wave characteristics may be calculated by using the Christoffel equation.

Referring to FIG. 1C, when the transverse and longitudinal waves pass through an anisotropic medium (AM) or an anisotropic layer $$(\rho, C_{66}, C_{16}, C_{11}),$$

in connection with the transverse and longitudinal waves, energy may be transferred proportionally to the transmission coefficients ($t_l$, $t_s$) and reflected proportionally to the reflection coefficients ($r_l$, $r_s$). Specifically, the transverse wave may pass through the anisotropic layer by the transmission coefficient ($t_s$) of the transverse wave, and be reflected by the reflection coefficient ($r_s$) of the transverse wave, and similarly, the longitudinal wave may pass through the anisotropic layer by the transmission coefficient ($t_l$) of the longitudinal wave may pass through and be reflected by the reflection coefficient ($r_l$) of the longitudinal wave.

Here, the anisotropic medium (AM) or anisotropic layer $$(\rho, C_{11}, C_{66}, C_{16})$$

may be represented by a 4×4 scattering matrix (hereinafter, referred to as 'S') as shown in FIG. 1D, and the transmission coefficients ($t_l$, $t_s$) may be expressed as the product of the reflection coefficient ($r_l$, $r_s$) and the 4×4 scattering matrix.

The present invention may theoretically calculate the isotropic layer or anisotropic layer transmittance of longitudinal and transverse waves by using the elastic wave equation and the transfer matrix technique, and if this method is used, a meta layer or a matching layer may be designed to fully transmit elastic waves between the incident medium and the target medium of FIG. 1A. In the following description, full penetration of longitudinal waves through barriers in an isotropic layer is considered, and at this time, the 4×4 scattering matrix(S) is reduced to a 2×2 matrix, and may be defined as in the following [Equation 1]. However, the present invention is not limited to full penetration of barriers due to the longitudinal waves in an isotropic medium, and is also applicable to full penetration of barriers due to longitudinal and transverse waves in an anisotropic medium.

$$S = \begin{bmatrix} AB \\ CD \end{bmatrix} \qquad \text{[Equation 1]}$$

Here, *A*, *B*, *C*, and *D* are as follows.

$$A = \frac{1}{2}\mathrm{Cos}[d_b k_b]\mathrm{Cos}[d_L k_L] - \frac{\mathrm{Sin}[d_b k_b]\mathrm{Sin}[d_L k_L]Z_L}{2Z_B} + i\left(-\frac{\mathrm{Cos}[d_L k_L]\mathrm{Sin}[d_b k_b]Z_A}{2Z_B} - \frac{\mathrm{Cos}[d_b k_b]\mathrm{Sin}[d_L k_L]Z_A}{2Z_L} - \frac{\mathrm{Cos}[d_L k_L]\mathrm{Sin}[d_b k_b]Z_B}{2Z_T} - \frac{\mathrm{Cos}[d_b k_b]\mathrm{Sin}[d_L k_L]Z_L}{2Z_T}\right) + \frac{\mathrm{Cos}[d_b k_b]\mathrm{Cos}[d_L k_L]Z_A}{2Z_T} - \frac{\mathrm{Sin}[d_b k_b]\mathrm{Sin}[d_L k_L]Z_A Z_B}{2Z_L Z_T}$$

$$B = \frac{1}{2}\mathrm{Cos}[d_b k_b]\mathrm{Cos}[d_L k_L] - \frac{\mathrm{Sin}[d_b k_b]\mathrm{Sin}[d_L k_L]Z_L}{2Z_B} + i\left(\frac{\mathrm{Cos}[d_L k_L]\mathrm{Sin}[d_b k_b]Z_A}{2Z_B} + \frac{\mathrm{Cos}[d_b k_b]\mathrm{Sin}[d_L k_L]Z_A}{2Z_L} - \frac{\mathrm{Cos}[d_L k_L]\mathrm{Sin}[d_b k_b]Z_B}{2Z_T} - \frac{\mathrm{Cos}[d_b k_b]\mathrm{Sin}[d_L k_L]Z_L}{2Z_T}\right) - \frac{\mathrm{Cos}[d_b k_b]\mathrm{Cos}[d_L k_L]Z_A}{2Z_T} - \frac{\mathrm{Sin}[d_b k_b]\mathrm{Sin}[d_L k_L]Z_A Z_B}{2Z_L Z_T}$$

$$C = \frac{1}{2}\mathrm{Cos}[d_b k_b]\mathrm{Cos}[d_L k_L] - \frac{\mathrm{Sin}[d_b k_b]\mathrm{Sin}[d_L k_L]Z_L}{2Z_B} + i\left(-\frac{\mathrm{Cos}[d_L k_L]\mathrm{Sin}[d_b k_b]Z_A}{2Z_B} + \frac{\mathrm{Cos}[d_b k_b]\mathrm{Sin}[d_L k_L]Z_A}{2Z_L} + \frac{\mathrm{Cos}[d_L k_L]\mathrm{Sin}[d_b k_b]Z_B}{2Z_T} + \frac{\mathrm{Cos}[d_b k_b]\mathrm{Sin}[d_L k_L]Z_L}{2Z_T}\right) - \frac{\mathrm{Cos}[d_b k_b]\mathrm{Cos}[d_L k_L]Z_A}{2Z_T} - \frac{\mathrm{Sin}[d_b k_b]\mathrm{Sin}[d_L k_L]Z_A Z_B}{2Z_L Z_T}$$

$$D = \frac{1}{2}\mathrm{Cos}[d_b k_b]\mathrm{Cos}[d_L k_L] - \frac{\mathrm{Sin}[d_b k_b]\mathrm{Sin}[d_L k_L]Z_L}{2Z_B} + i\left(\frac{\mathrm{Cos}[d_L k_L]\mathrm{Sin}[d_b k_b]Z_A}{2Z_B} + \frac{\mathrm{Cos}[d_b k_b]\mathrm{Sin}[d_L k_L]Z_A}{2Z_L} + \right.$$

-continued $$\frac{\mathrm{Cos}[d_Lk_L]\mathrm{Sin}[d_bk_b]Z_B}{2Z_T} + \frac{\mathrm{Cos}[d_bk_b]\mathrm{Sin}[d_Lk_L]Z_L}{2Z_T}\Bigg) + \frac{\mathrm{Cos}[d_bk_b]\mathrm{Cos}[d_Lk_L]Z_A}{2Z_T} - \frac{\mathrm{Sin}[d_bk_b]\mathrm{Sin}[d_Lk_L]Z_AZ_B}{2Z_LZ_T}$$

Here, $Z_I$ is the impedance of the incident medium, $Z_T$ the impedance of the target medium, $Z_B$ is the impedance of the barrier, $Z_L$ is the impedance of the matching layer, $k_B$ is the wave number of the barrier, and $k_L$ is the wave number of the matching layer, $d_B$ is the thickness of the barrier, and $d_L$ is the thickness of the acoustic matching member. In the present invention, the incident medium for realizing full transmission of ultrasound is indicated by "I", the transmitted medium is indicated by "T", and the barrier existing between the two media is denoted by "B", and the matching layer in the present invention is denoted by "L".

Here, the condition for full transmission is |R|=0, and the reflection (or amplitude) R is as shown in [Equation 2] below.

$$R = \frac{\begin{gathered}\cos[d_Lk_L]Z_L(\cos[d_bk_b]Z_B(-Z_A+Z_T)+\\ i\,\sin[d_bk_b](Z_B^2-Z_AZ_T))+\\ \sin[d_Lk_L](i\,\cos[d_bk_b]Z_B(Z_L^2-Z_AZ_T)+\\ \sin[d_bk_b](Z_AZ_B^2-Z_L^2Z_T))\end{gathered}}{\begin{gathered}\cos[d_Lk_L]Z_L(-\cos[d_bk_b]Z_B(Z_A+Z_T)-\\ i\,\sin[d_bk_b](Z_B^2+Z_AZ_T))+\\ \sin[d_Lk_L](-i\,\cos[d_bk_b]Z_B(Z_L^2+Z_AZ_T)+\\ \sin[d_bk_b](Z_AZ_B^2-Z_L^2Z_T))\end{gathered}} \quad \text{[Equation 2]}$$

Here, in order for R=0, the numerator of [Equation 2] must be 0, as shown in [Equation 3] below.

$$\begin{gathered}\to \cos[d_bk_b]\cos[d_Lk_L]Z_BZ_L(-Z_A+Z_T)+\\ \sin[d_bk_b]\sin[d_Lk_L](Z_AZ_B^2-Z_L^2Z_T)+i(\cos[d_Lk_L]\sin[d_bk_b]\\ Z_L(Z_B^2-Z_AZ_T)+\cos[d_bk_b]\sin[d_Lk_L]Z_B(Z_L^2-Z_AZ_T))=0\\ \to \begin{pmatrix}\cos[d_bk_b]Z_BZ_L(-Z_A+Z_T) & \sin[d_bk_b](Z_AZ_B^2-Z_L^2Z_T)\\ \sin[d_bk_b]Z_L(Z_B^2-Z_AZ_T) & \cos[d_bk_b]Z_B(Z_L^2-Z_AZ_T)\end{pmatrix}\cdot\\ \begin{pmatrix}\cos[d_Lk_L]\\ \sin[d_Lk_L]\end{pmatrix}=0\end{gathered} \quad \text{[Equation 3]}$$

Here, since all of them are 0 in [Equation 3], Det(A)=0. Using this, the impedance ($Z_L$) of the matching layer is equal to [Equation 4].

$$Z_L = Z_B\sqrt{\frac{\begin{gathered}+\cos(d_Bk_B)^2Z_IZ_T^2-\cos(d_Bk_B)^2Z_I^2Z_T-\\ \sin(d_Bk_B)^2Z_I^2Z_T+\sin(d_Bk_B)^2Z_IZ_B^2\end{gathered}}{\begin{gathered}-\cos(d_Bk_B)^2Z_IZ_B^2+\cos(d_Bk_B)^2Z_B^2Z_T+\\ \sin(d_Bk_B)^2Z_B^2Z_T-\sin(d_Bk_B)^2Z_IZ_T^2\end{gathered}}} \quad \text{[Equation 4]}$$

or $$Z_L = Z_B\sqrt{\frac{+Z_AZ_T^2-Z_A^2Z_T-\tan[d_bk_b]^2Z_A^2Z_T+\tan[d_bk_b]^2Z_AZ_B^2}{-Z_AZ_B^2+Z_B^2Z_T+\tan[d_bk_b]^2Z_B^2Z_T-\tan[d_bk_b]^2Z_AZ_T^2}}$$

When $Z_L$ of [Equation 4] is substituted into [Equation 2] or [Equation 3], the thickness ($d_L$) and wave number of the matching layer are defined as the following [Equation 5].

$$d_Lk_L = \pm\arccos\left(\frac{\pm\sin(2d_Bk_B)\sqrt{Z_I}\,(Z_B^2-Z_T^2)}{2\sqrt{\begin{gathered}Z_T(\sin(d_Bk_B)^2Z_B^4-2Z_IZ_B^2Z_T+\\ \cos(d_Bk_B)^2Z_B^2Z_T^2+\\ Z_I^2(\cos(d_Bk_B)^2Z_B^2+\sin(d_Bk_B)^2Z_T^2))\end{gathered}}}\right) \quad \text{[Equation 5]}$$

As described above, when the incident medium and the target medium of FIG. 1A are different, the barrier penetration impedance/phase condition, that is, the impedance ($Z_L$), thickness ($d_L$), and wave number of the matching layer may be designed based on [Equation 4] and [Equation 5].

In addition, the impedance ($Z_L$), thickness ($d_L$), and wave number of the matching layer affect the density (ρ) and the longitudinal stiffness $$C_{11}$$

as shown in the following [Equation 6].

$$\rho = \frac{Z_Lk_L}{\omega},\ C_{11} = \frac{Z_L}{k_L}\omega \quad \text{[Equation 6]}$$

In conclusion, the impedance ($Z_L$), thickness ($d_L$), and wave number of the matching layer depend on the design of the density (ρ) and longitudinal stiffness $$C_{11}$$

of the matching layer may be determined.

FIG. 2A to FIG. 6B are graphs showing relationships among a reflection coefficient, a product ($d_bk_b$) of a thickness of a barrier and a wave number, and a product ($d_Lk_L$) of a thickness and a wave number of a matching layer according to an embodiment of the present invention.

Figure 2A:
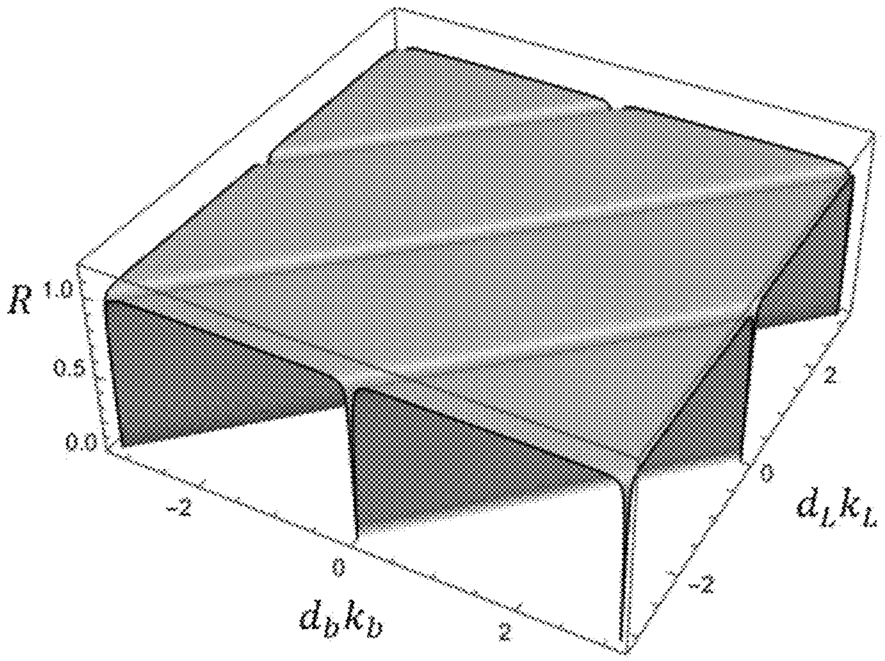
FIG. 2A to FIG. 6B are graphs showing relationships among a reflection coefficient, a product ($d_b k_b$) of a thickness of a barrier and a wave number, and a product ($d_L k_L$) of a thickness and a wave number of a matching layer according to an embodiment of the present invention.
Figure 2B:
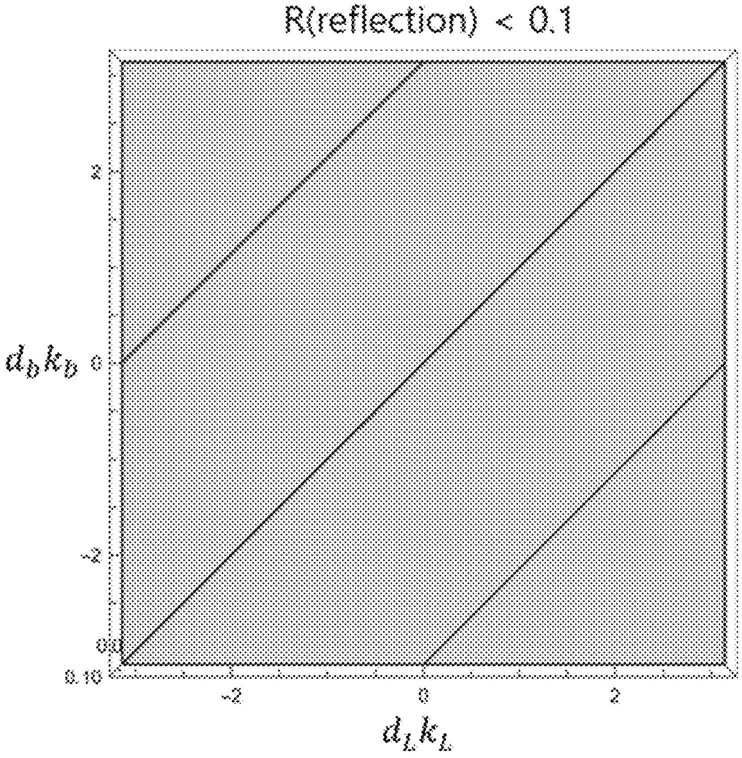

Referring to FIGS. 2A and 2B, they show the relationships among the reflection coefficient (R), the product ($d_bk_b$) of the thickness and the wave number of the barrier, and product ($d_Lk_L$) of the wave number and the thickness of the matching layer under the condition that the incident medium, the barrier, and the target medium are water, steel, and water, respectively.

Figure 3A:
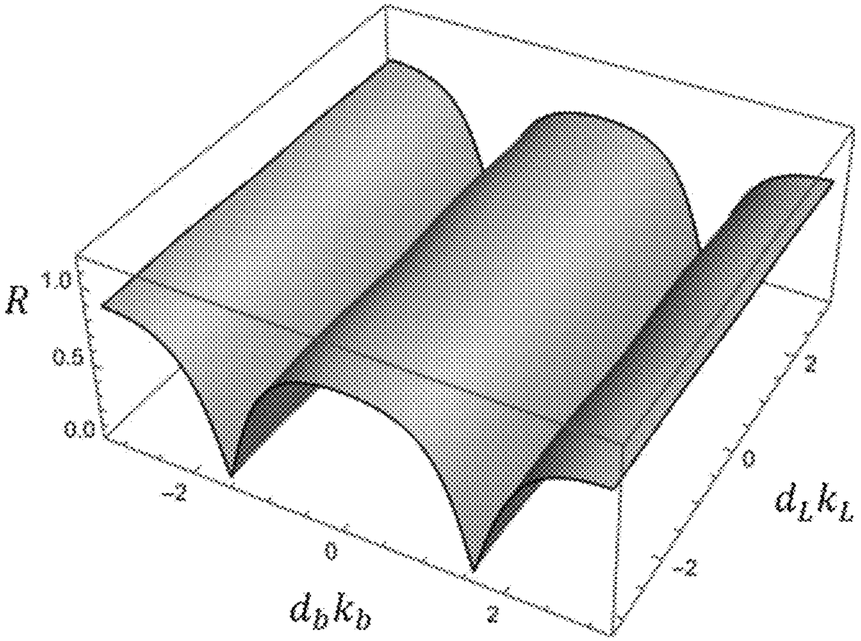
Figure 3B:
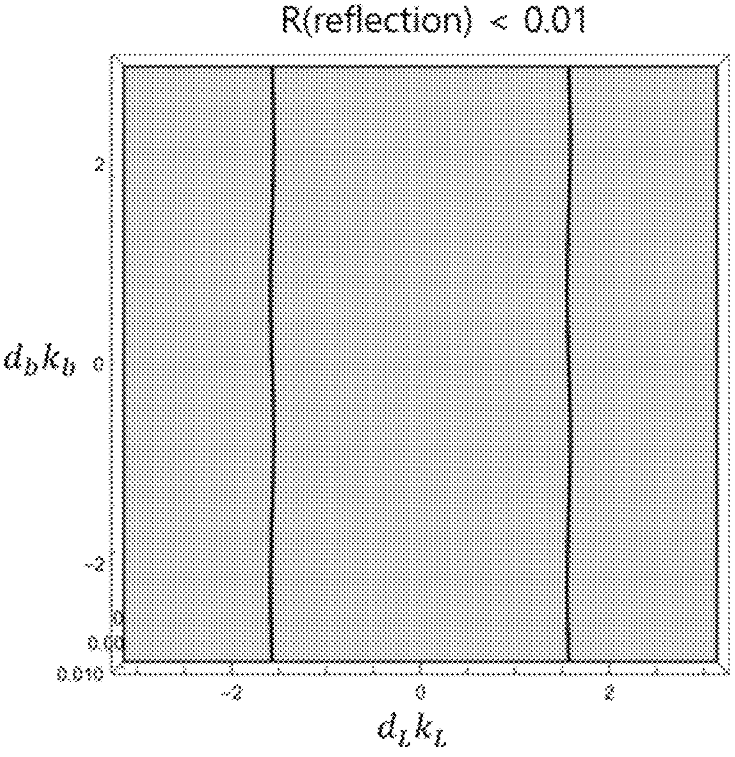

Referring to FIGS. 3A and 3B, they show the relationship among the product of and the wave number the reflection coefficient (R), the product ($d_bk_b$) of the thickness and the wave of the barrier, and the product ($d_Lk_L$) of the wave number and the thickness of the matching layer under the condition that the incident medium, the barrier, and the target medium are PEEK (Polyetheretherketone), Steel, and Copper, respectively.

Figure 4A:
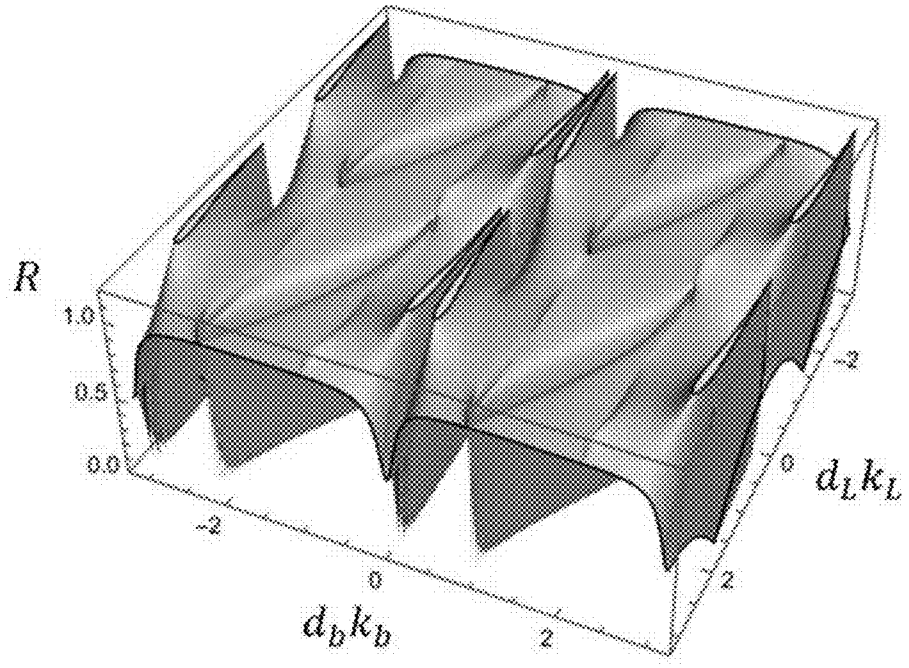
Figure 4B:
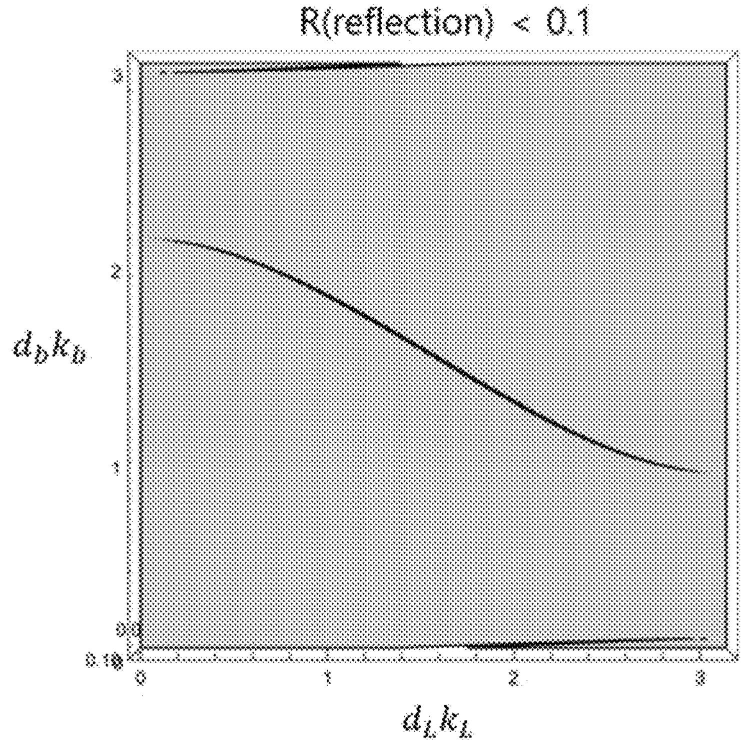

Referring to FIGS. 4A and 4B, they show the relationship among the product of and the wave number the reflection coefficient (R), the product ($d_bk_b$) of the thickness and the wave of the barrier, and the product ($d_Lk_L$) of the wave number and the thickness of the matching layer under the condition that the incident medium, the barrier, and the target medium are Al (aluminum), Water, and Steel, respectively.

Figure 5A:
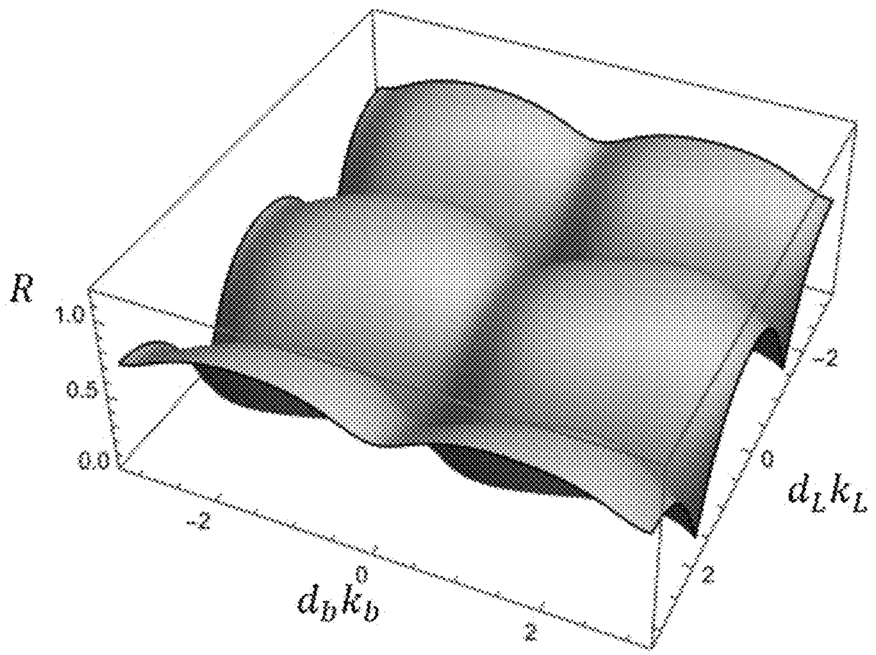
Figure 5B:
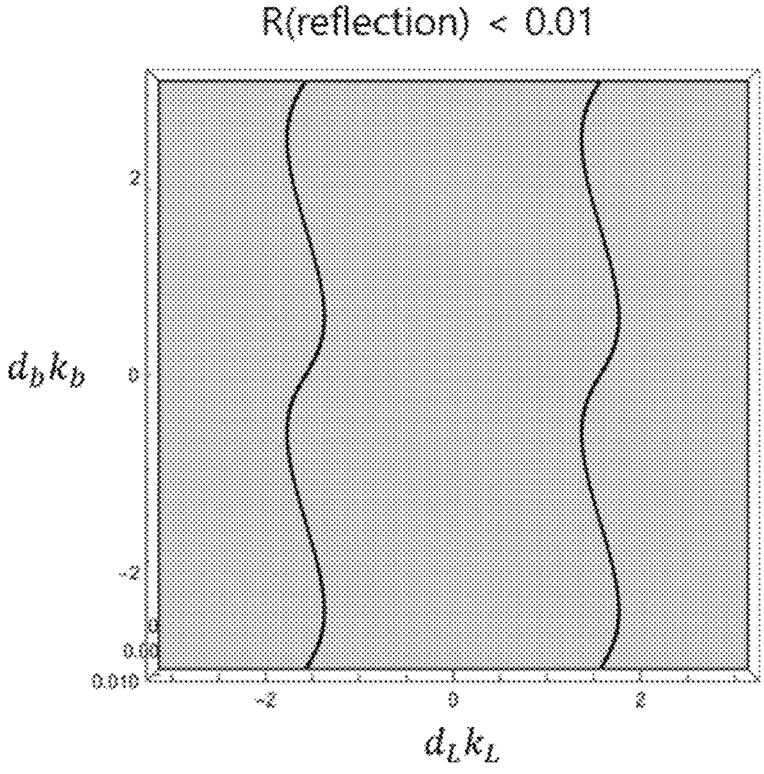

Referring to FIGS. 5A and 5B, they show the relationship among the product of and the wave number the reflection coefficient (R), the product ($d_bk_b$) of the thickness and the wave of the barrier, and the product ($d_L k_L$) of the wave number and the thickness of the matching layer under the condition that the incident medium, the barrier, and the target medium are Al (aluminum), Water, and PEEK (Polyetheretherketone), respectively.

Figure 6A:
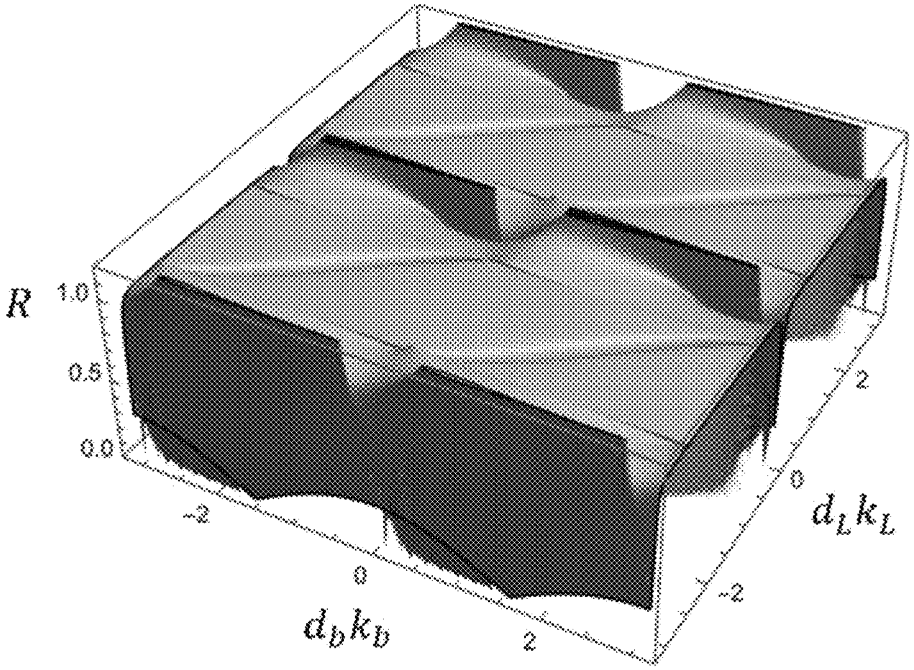
Figure 6B:
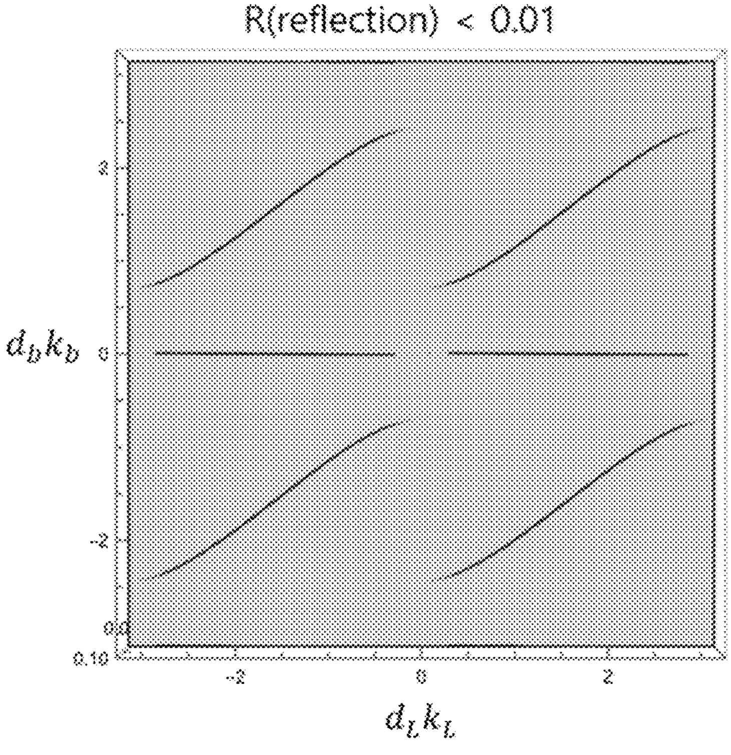

Referring to FIGS. 6A and 6B, they show the relationship among the product of and the wave number the reflection coefficient (R), the product ($d_b k_b$) of the thickness and the wave of the barrier, and the product ($d_L k_L$) of the wave number and the thickness of the matching layer under the condition that the incident medium, the barrier, and the target medium are PEEK (Polyetheretherketone), Steel, and Water, respectively.

Figure 7:
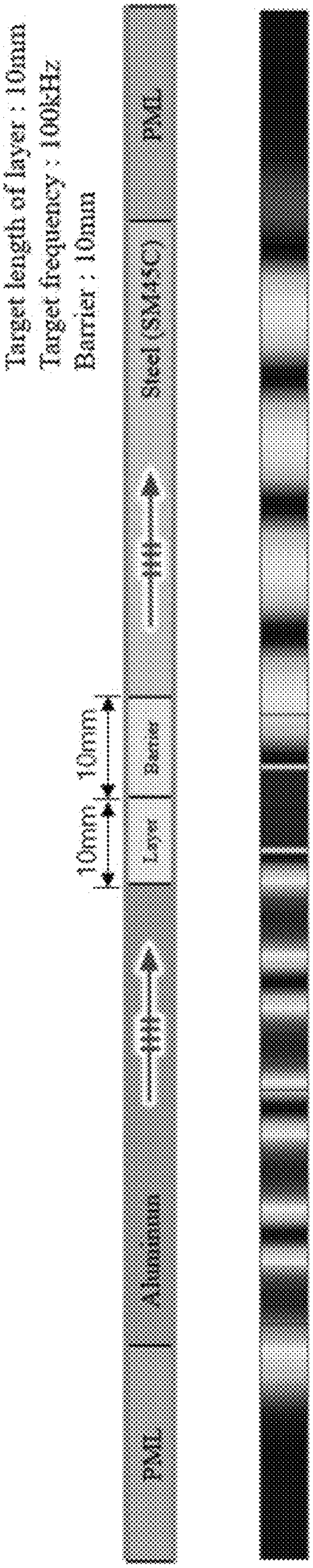
FIG. 7 is a diagram for explaining FEM simulation conditions for testing matched layer transmission performance according to an embodiment of the present invention.

FIG. 7 is a diagram for explaining experimental conditions for testing matched layer transmission performance according to an embodiment of the present invention, and FIG. 8 is an experiment result table in the simulation environment of FIG. 7.

Referring to FIG. 7, under the condition that the incident medium is aluminum, the target medium is steel, the thickness of the barrier and the matching layer is 10 mm, the target length of the layer is 10 mm, the target frequency is set to 100 kHz, and the barrier is set as the effective physical properties of aluminum, lead, glass, skull bone, and copper, a simulation was performed by using the COMSOL Multiphysics 5.3 simulation tool, respectively. At this time, when the impedance ($Z_L$) and the phase (a product of a thickness and a wave number, $d_L k_L$) of the layer are set as shown in the table of FIG. 8, it may be confirmed that the transmittance is 100%.

Figure 9A:
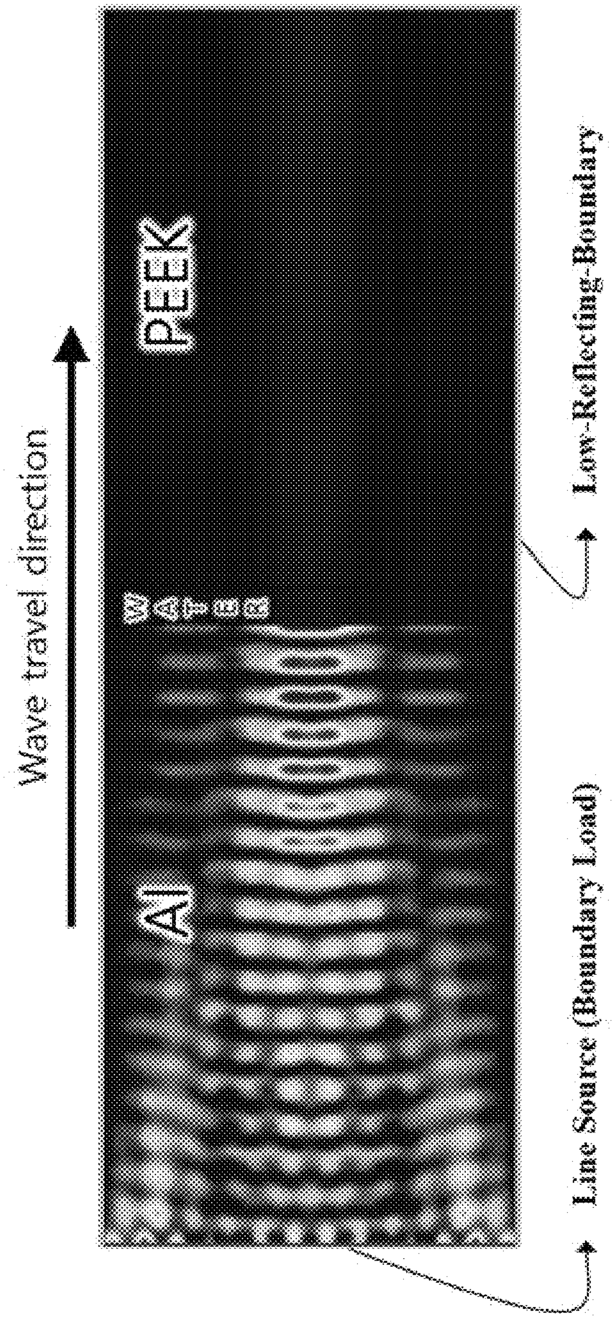
FIG. 9A and FIG. 9B are diagrams comparing the transmission performances of the present invention to which a design for penetrating a heterogeneous medium barrier is applied and a conventional transmission design to which the design is not applied.
Figure 9B:
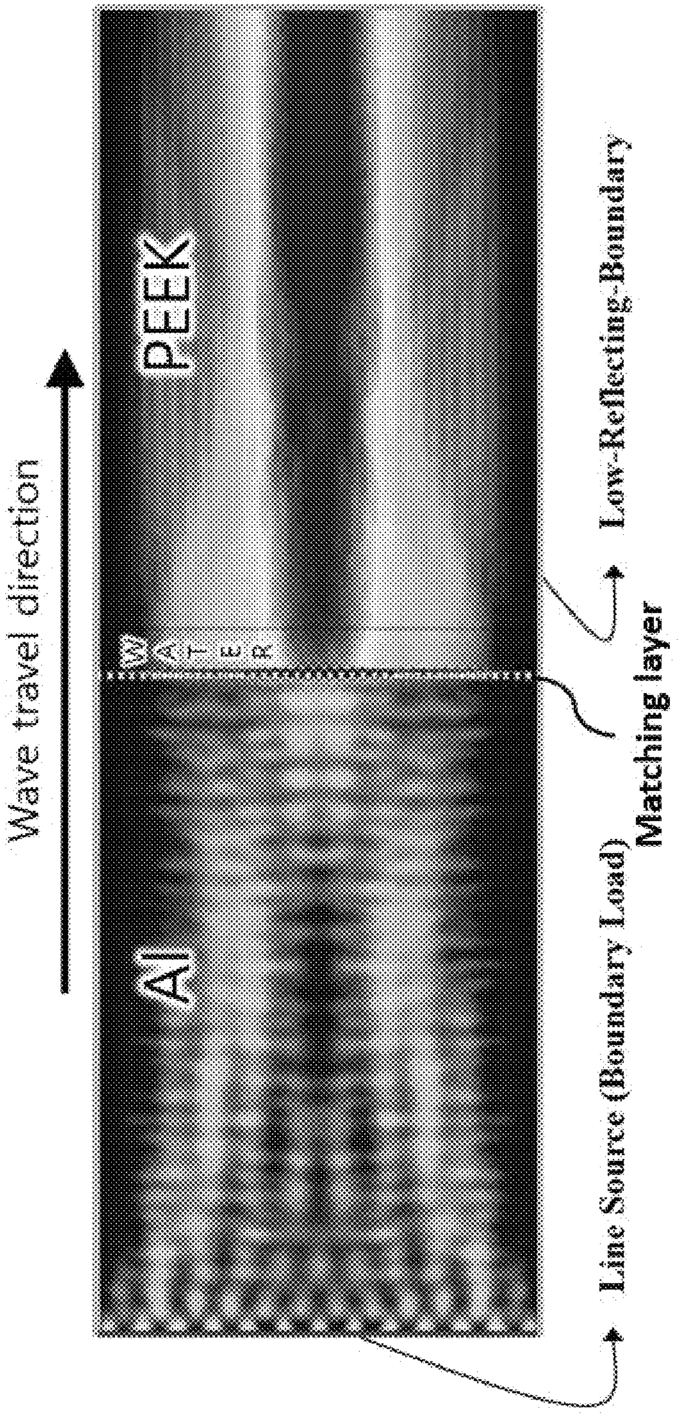

FIG. 9A and FIG. 9B are diagrams comparing the transmission performances of the present invention to which a design for penetrating a heterogeneous medium barrier is applied and a conventional transmission design to which the design is not applied.

Referring to FIG. 9A, it may be seen that the transmittance is low when a sound wave passes through an incident medium of aluminum, a water barrier, and a target medium of PEEK by using the COMSOL Multiphysics 5.3 simulation tool in an environment in which the above-described matching layer is not used.

Referring to FIG. 9B, when a sound wave passes through an aluminum incident medium, a water barrier, and a PEEK target medium by using the COMSOL Multiphysics 5.3 simulation tool, if the aforementioned matching layer is used between the incident medium and the barrier, it may be confirmed that the transmittance appears high.

Figure 10A:
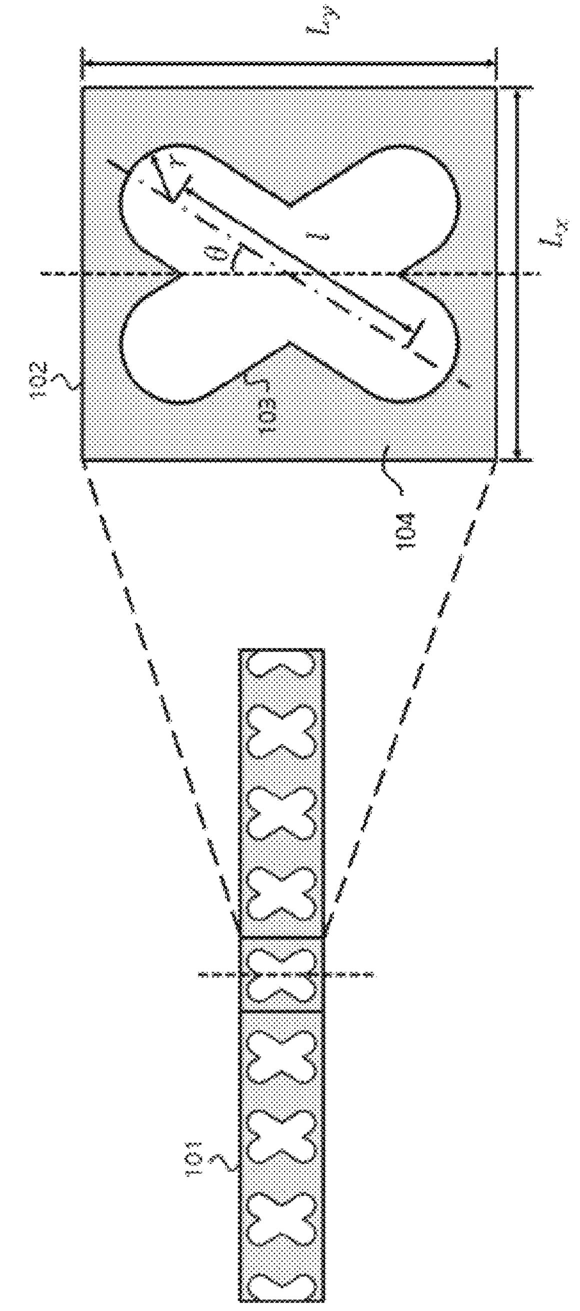
FIG. 10A to FIG. 10D are diagrams illustrating an acoustic matching member according to an embodiment of the present invention.

FIG. 10A is an acoustic matching member 101 according to an embodiment of the present invention. The acoustic matching member 101 may correspond to the aforementioned matching layer or meta layer.

Referring to FIG. 10A, the acoustic matching member 101 may be designed to satisfy impedance and phase change matching conditions so that ultrasound may be transmitted through a barrier positioned between an incident medium and a target medium. To this end, the acoustic matching member 101 may include a matching pattern 102 which determines the impedance and phase change of the acoustic matching member 101. The matching pattern 102 may determine the impedance ($Z_L$), the thickness ($d_L$), and the wave number of the aforementioned matching layer. In addition, the impedance ($Z_L$), the thickness ($d_L$), and the wave number of the matching layer may affect the density (ρ) and longitudinal stiffness $$C_{11}$$

of the matching layer. Therefore, it is possible to fully transmit ultrasound through the design of the density (ρ) and the longitudinal stiffness $$C_{11}$$

of the matching layer. In one embodiment, as a non-limiting example, the matching pattern 102 may include a structure in which a unit structure including a single X-shaped pattern 103 is arranged to determine, in order to determine the density ρ and the longitudinal stiffness $$C_{11}$$

The ultrasound may be referred to as a longitudinal wave having a frequency of 20 kHz or higher and propagating in a solid or fluid medium.

The impedance and phase change of the acoustic matching member 101 may be determined according to at least one design variable designed by the matching pattern 102. The design variables may include a horizontal length ($L_x$) and a vertical length ($L_y$) of the unit structure 102, a length (l), a radius (r), and a rotation angle (θ) of the X-shaped pattern. The design variables may determine physical property values such as density ρ and longitudinal stiffness $$C_{11}$$

of the acoustic matching member 101 of the [Equation 6]. The length (l) of the X-shaped pattern is the length excluding the semicircular shape at the end of the X-shaped pattern, the radius (r) of the X-shaped pattern corresponds to ½ the thickness of the X-shaped pattern, the thickness of the X-shaped pattern corresponds to the diameter (2r) of the semicircular shape, and the rotation angle (θ) of the X-shaped pattern is an angle between the axis of the vertical length ($L_y$) and the axis of the length (l) of the X-shaped pattern.

The impedance matching condition according to the unit structure including the X-shaped single pattern 103 is as shown in Equation 4, and the phase change matching condition according to the unit structure including the X-shaped single pattern 103 is same as the above <Equation 5>.

In an embodiment, the impedance and phase change matching conditions may be based on destructive interference conditions of reflected waves generated by multiple internal reflections occurring inside the acoustic matching member and the barrier.

In one embodiment, the remaining second region 104 other than the first region of the matching pattern 102 and the matching pattern 103 may have different media or different thicknesses. As a non-limiting example, the first region 103 may be a through hole or an X shape in the form of an embossed or engraved X. Preferably, the material and shape of the remaining second region 104 other than the first region 103 and the matching pattern 103 may be set to fully transmit ultrasound. In another embodiment, the first area or the second area may be filled with void or other material.

In one embodiment, the acoustic matching member 101 is located between the incident medium and the barrier, and the first surface of the acoustic matching member 101 is coupled to or in contact with the one surface of the incident medium, and the opposing second surface of the acoustic matching member 101 facing the first surface may be coupled to or be in contact with one surface of the barrier.

In one embodiment, as a non-limiting example, the acoustic matching member 101 may include a resin component, and the resin component may include a polyimide resin, an epoxy resin, a glass fiber-reinforced epoxy resin, or a thermoplastic resin. In addition, the acoustic matching member 101 may be used in ultrasound treatment devices, diagnostic devices, imaging devices, and industrial ultrasound non-destructive testing equipment.

Figure 10B:
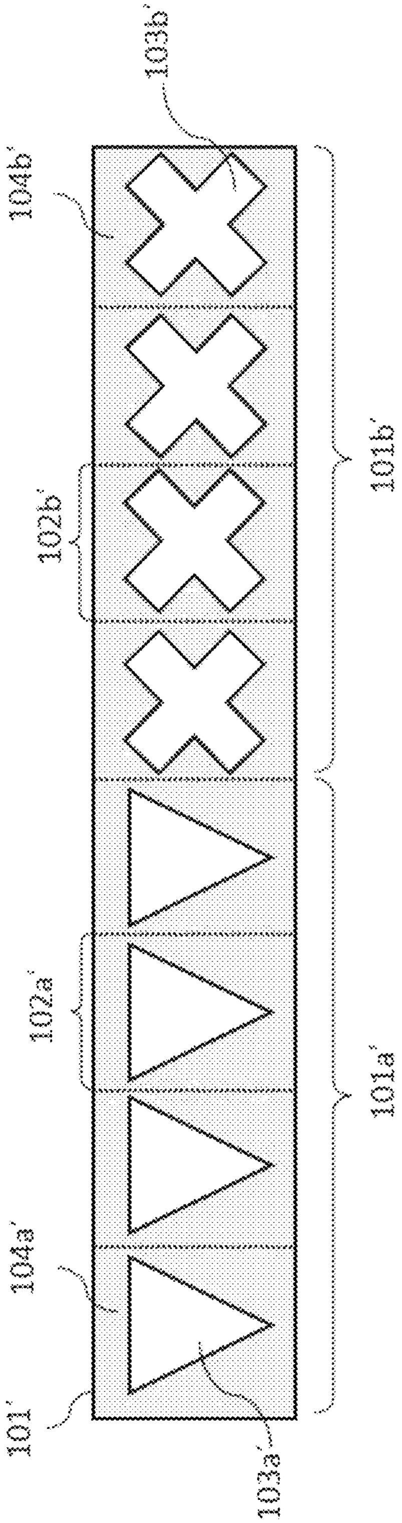

FIG. 10B is an acoustic matching member 101' according to another embodiment of the present invention.

Referring to FIG. 10B, the acoustic matching member 101' may be divided into two sub acoustic matching members 101*a*' and 101*b*', the first sub acoustic matching member 101*a*' includes four-unit inverted triangle structure 102*a*' as a non-limiting example, and each unit inverted triangular structure 102*a*' may be divided into a first area 103*a*' and a second area 104*a*'. The first area 103*a*' may be an area having an inverted triangle shape, and the second area 104*a*' may be a remaining area other than the first area 103*a*'. The second sub-acoustic matching member 101*ba*' includes four-unit X-shaped structures 102*b*', and each unit X-shaped structure 102*b*' may be divided into a first area 103*b*' and a second area 104*b*'. The first region 103*b*' may be an X-shaped region, and the second region 104*b*' may be a remaining area other than the first region 103*b*'.

Similarly, the first regions 103*a*' and 103*b*' and the second regions 104*a*' and 104*b*' may have media or different thicknesses from each other according to impedance and phase change matching conditions so that ultrasound may pass through barriers located between the incident medium and the target medium. As a non-limiting example, the first regions 103*a*' and 103*b*' may be through-holes or may have embossed or engraved inverted triangles or X-shapes. Preferably, the constituent materials and the shapes of the first regions 103*a*' and 103*b*' and the second regions 104*a*' and 104*b*' may be set according to circumstances. Design variables considered based on the first regions 103*a*' and 103*b*' may be different from or the same as those of the first region 103 of FIG. 10A.

Although four units inverted triangle structures 102*a*' and four units X-shaped structures 102*b*' are symmetrically arranged in FIG. 10B, the present invention is not limited thereto and the inverted triangle structure 102*a*' and unit X The female-shaped structures 102*b*' may be regularly or irregularly mixed and arranged.

Figure 10C:
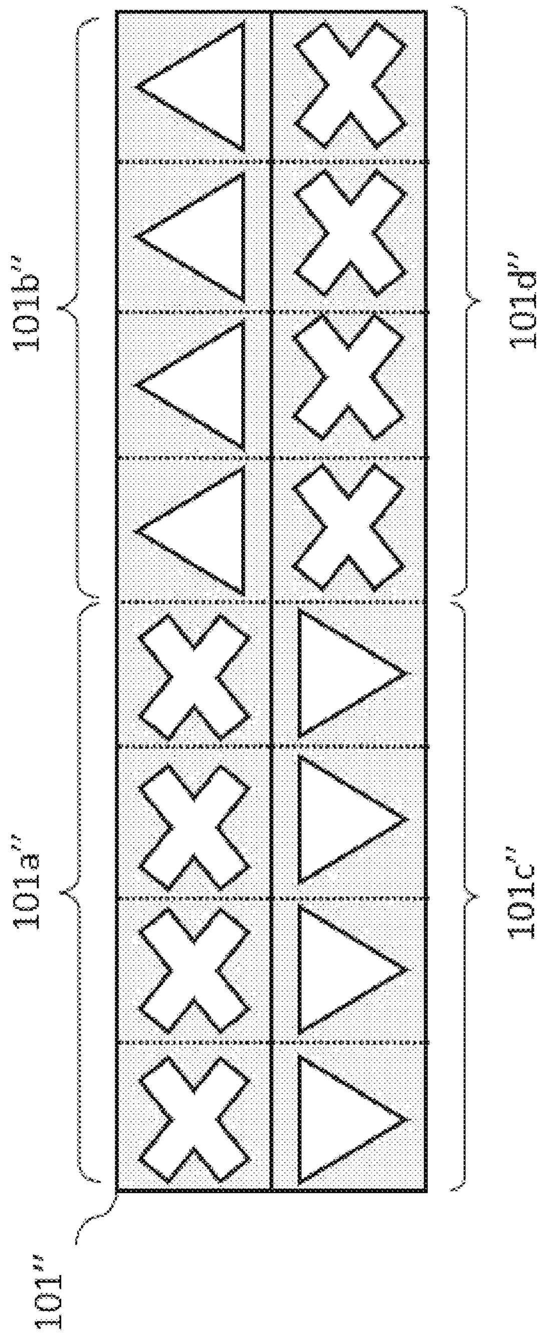

FIG. 10C is an acoustic matching member 101" according to another embodiment of the present invention.

Referring to FIG. 10C, the acoustic matching member 101" may be divided into four sub-sound matching members 101*a*", 101*b*", 101*c*", and 101*d*". The four sub-sound matching members 101*a*", 101*b*", 101*c*", 101*d*" have a 2×8 array structure. As a non-limiting example, the first sub-sound matching member 101*a*" may include four units X-shaped structures, the second sub-sound matching member 101*b*" may include four units triangular structures, the third sub-sound matching member 101*c*" may include four unit inverted triangular structures, and the fourth sub-acoustic matching member 101*d*" may include four unit X-shaped structure. As shown in FIG. 10A and FIG. 10B, the unit X-shaped structure, the unit triangular structure, and the unit inverted triangle structure are divided into a first area and a second area, respectively, and the material and the shape of the first region and the second region may be set such that ultrasound fully may penetrate through the barrier.

Figure 10D:
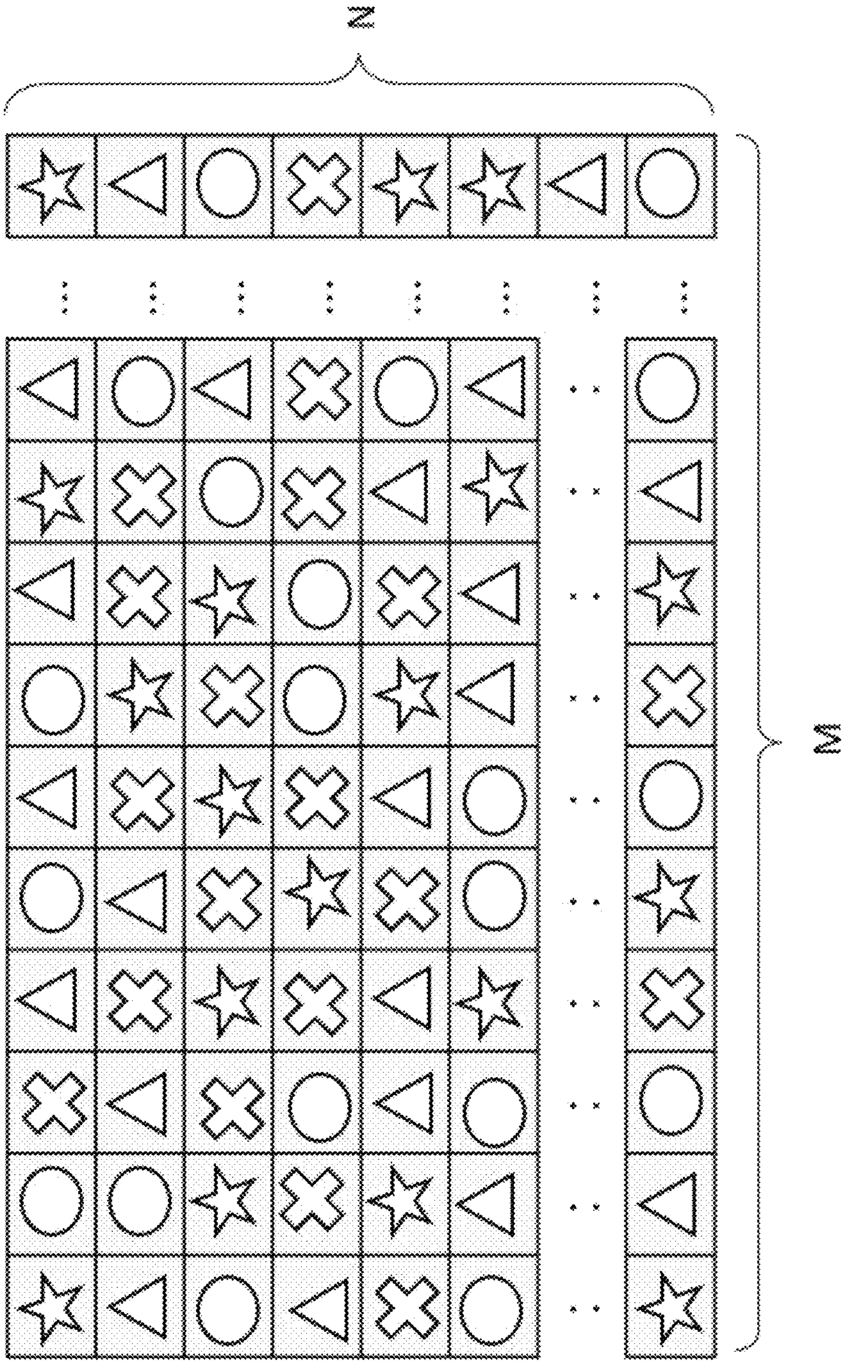

Generalizing FIG. 10C, as shown in FIG. 10D, the acoustic matching members are divided into M×N sub acoustic matching members and have an M×N array structure. M and N may be natural numbers greater than 0.

Figure 10E:
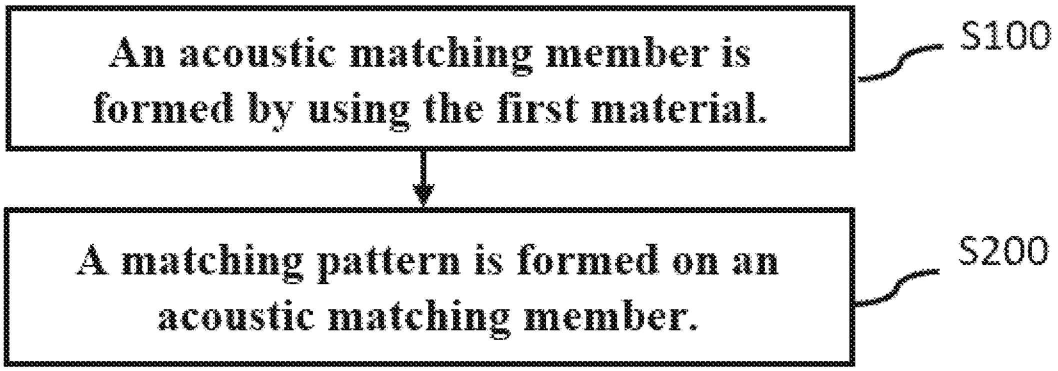
FIG. 10E is a flowchart for explaining a method of manufacturing the acoustic matching member according to an embodiment of the present invention.

FIG. 10E is a flowchart illustrating a method of manufacturing an acoustic matching member 101 according to an embodiment of the present invention.

Referring to FIG. 10E, the method of manufacturing the acoustic matching member 101 may include a step (S100) for forming an acoustic matching member without a matching pattern by using a first material, and a step for (S200) forming a matching pattern on the acoustic matching member without a matching pattern. The step (S200) for forming the matching pattern on the acoustic matching member may include, but is not limited to, mechanical processing, laser processing, and injection mold processing. The matching pattern is based on design variables set so that the above-described ultrasound may fully penetrates the barrier, and the mechanical processing, and the laser processing, and the injection mold processing may be performed based on the design parameters. The first material may include a resin component, and the resin component may include a polyimide resin, an epoxy resin, a glass fiber-reinforced epoxy resin, or a thermoplastic resin.

As described above, the acoustic matching member 101 of the present invention may overcome barriers between the incident medium and the target medium and realize full transmission without loss of ultrasound through a simple structure which may be easily manufactured. To this end, the present invention suggests the condition (e.g., Equation 1 and Equation 2 above) which the impedance ($Z_L$) and the phase change ($d_L k_L$) of the acoustic matching member 101 disposed in front of the barrier must satisfy in order to realize full transmission of ultrasound. The condition which the impedance ($Z_L$) and the phase change ($d_L k_L$) must satisfy may be induced as a condition of full transmission of ultrasound by using the destructive interference condition of the reflected wave generated by the multiple internal reflection phenomenon occurring inside the acoustic matching member 101 and the barrier.

In addition, the present invention discloses a matching pattern capable of effectively controlling the impedance and phase change of the acoustic matching member 101 installed in front of the barrier. The matching pattern of the present invention is an X-shaped single pattern 103 having a total of five design variables, and the X-shaped single pattern may be formed through mechanical processing. It is possible to design an acoustic matching which satisfies the conditions of the impedance and phase change of <Equation 1> and <Equation 2> by adjusting a total of five design variables which determine the X-shaped single pattern 103 of the acoustic matching member 101 in the present invention. Member 101 may be designed. When the acoustic matching member 101 is placed in front of a barrier, 100% of the ultrasound generated from the incident medium may be transmitted to the target medium while overcoming the barrier.

In addition, since the acoustic matching member 101 of the present invention is designed according to a matching pattern having a simple structure which may be easily manufactured, the problems in the prior art requiring complicated and precise processing may be improved. Accordingly, there is an effect that full transmission of ultrasound over a barrier may be easily implemented. In addition, when the acoustic matching member 101 of the present invention is used, full transmission may be implemented not only when the incident medium and the target medium are the same, but also when the incident medium and the target medium are different.

Preferably, when the acoustic matching member 101 of the present invention is used, ultrasound may be fully transmitted to the target to be measured beyond the barrier. Here, full transmission means that ultrasound is transmitted from one medium to another medium with almost 100% energy efficiency without reflection.

Figure 11A:
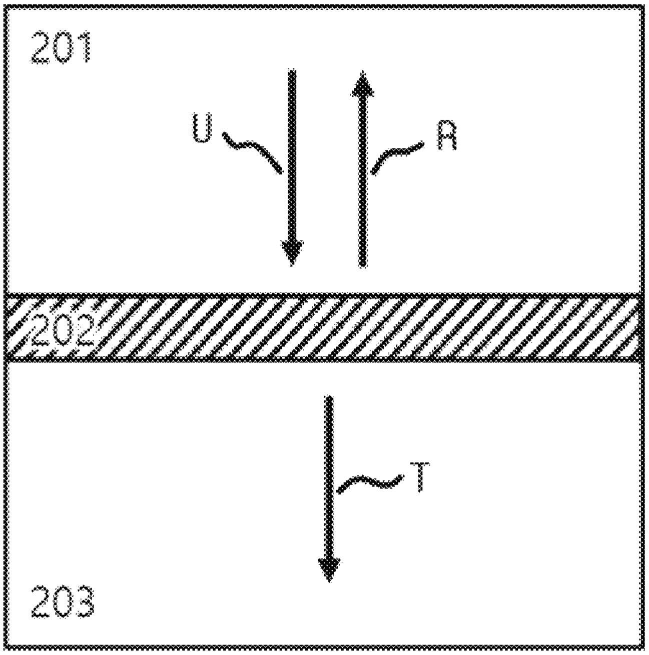
FIG. 11A is a diagram showing ultrasound propagation between an incident medium and a target medium in an environment in which an acoustic matching member is not used.
Figure 11B:
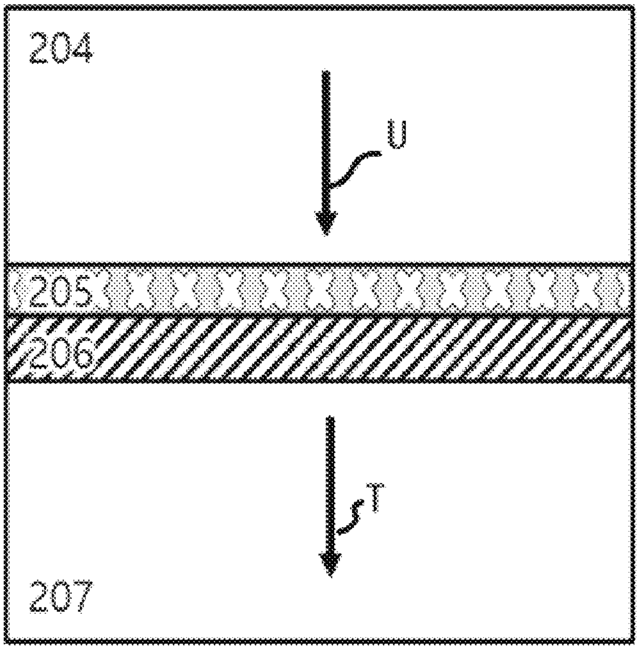
FIG. 11B is a diagram illustrating ultrasound propagation between an incident medium and a target medium in an environment using an acoustic matching member according to an embodiment of the present invention.

FIG. 11A is a diagram showing ultrasound propagation between a particle medium and a target medium in an environment in which an acoustic matching member is not used, and FIG. 11B is a diagram showing ultrasound propagation between a particle medium and a target medium in an environment using an acoustic matching member according to an embodiment of the present invention.

Referring to FIG. 11A, when a barrier 202 is placed between the incident medium 201 and the target medium 203, and the ultrasound U travels from the incident medium 201 to the target medium 203, the transmission (T) and reflection (R) may occur. Unless the barrier itself functions as an impedance matching layer for the incident medium 201 and the target medium 203, full transmission of ultrasound is impossible.

Referring to FIG. 11B, when a barrier 206 is positioned between the incident medium 204 and the target medium 207, and an acoustic matching member 205 of the present invention is disposed between the incident medium 204 and the barrier 206, as the ultrasound U proceeds from the incident medium 204 to the target medium 207, the ultrasound U may be fully transmitted (T) due to the impedance and the phase change condition of the acoustic matching member 205. If there are no discrepancies, the acoustic matching member 205 is identical to the acoustic matching member 101 of FIG. 10A, and reference may be made to the description thereof.

That is, when the acoustic matching member 101 is not used as shown in FIG. 11A, the transmittance is remarkably reduced due to the generation of unwanted reflected waves, but when the acoustic matching members 101 and 205 of the present invention are disposed in front of the barrier as shown in FIG. 11B, ultrasound may be fully transmitted without reflection.

In one embodiment, in order to observe the transmitted energy according to the frequency of the ultrasound barrier fully penetrating acoustic matching members 101 and 205, the incident medium is configured to consist of aluminum (impedance: $1.44592\times10^{7}$ $kgm^{-2}s^{-1}$), the target medium is PEEK (impedance: $2.75698\times10^{6}$ $kgm^{-2}s^{-1}$), and the barrier, that is water (impedance: $1.49550\times10^{6}$ $kgm^{-2}s^{-1}$) thickness: 33.75 mm). When a longitudinal wave with a frequency of 100 kHz is incident to the incident medium in a situation containing aluminum/water/PEEK, the transmittance is only 14%. On the other hand, when the acoustic matching members 101 and 205 (impedance: $3.54244\times10^{7}$ $kgm^{-2}s^{-1}$, thickness: 9 mm) designed to satisfy the impedance and phase change conditions of Equation 1 and Equation 2 above are applied to the front of a barrier, for example, aluminum and water, and a longitudinal wave with a frequency of 100 kHz is incident to the incident medium, the longitudinal wave with a frequency of 100 kHz may be fully transmitted (transmittance 100%). A graph of transmitted energy in a frequency band (50 kHz to 150 kHz) around a target frequency (eg, 100 kHz) according to the presence or absence of the acoustic matching member 101 of the present invention is shown in FIG. 12 as below.

Figure 12:
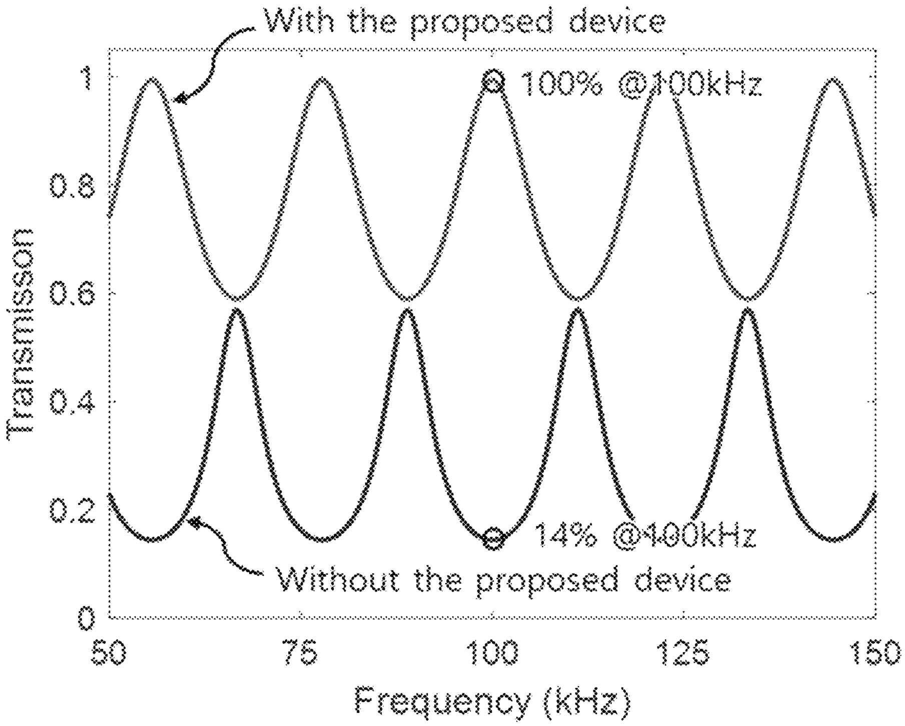
FIG. 12 is a graph showing a comparison of ultrasound transmittance between a case in which an acoustic matching member is not used and a case in which an acoustic matching member is used according to an embodiment of the present invention.

FIG. 12 is a graph showing a comparison of ultrasound transmittance between a case in which an acoustic matching member is not used and a case in which an acoustic matching member is used according to an embodiment of the present invention.

Referring to FIG. 12, in connection with a case that the acoustic matching members 101 and 205 are used between the barrier shear, for example, between aluminum and water (with the proposed device), and a case that the acoustic matching members 101 and 205 are not used (without the proposed device), the ultrasound energy transmittance according to the frequency are shown. It may be seen that the transmittance was only about 14% when the acoustic matching members 101 and 205 are not used at the target frequency of 100 kHz, but the transmittance reaches almost 100% when the acoustic matching members 101 and 205 are used. Furthermore, it may be seen that when the acoustic matching members 101 and 205 of the present invention are used, transmittance is higher in all frequency bands than when the acoustic matching members 101 and 205 are not used.

Figure 13A:
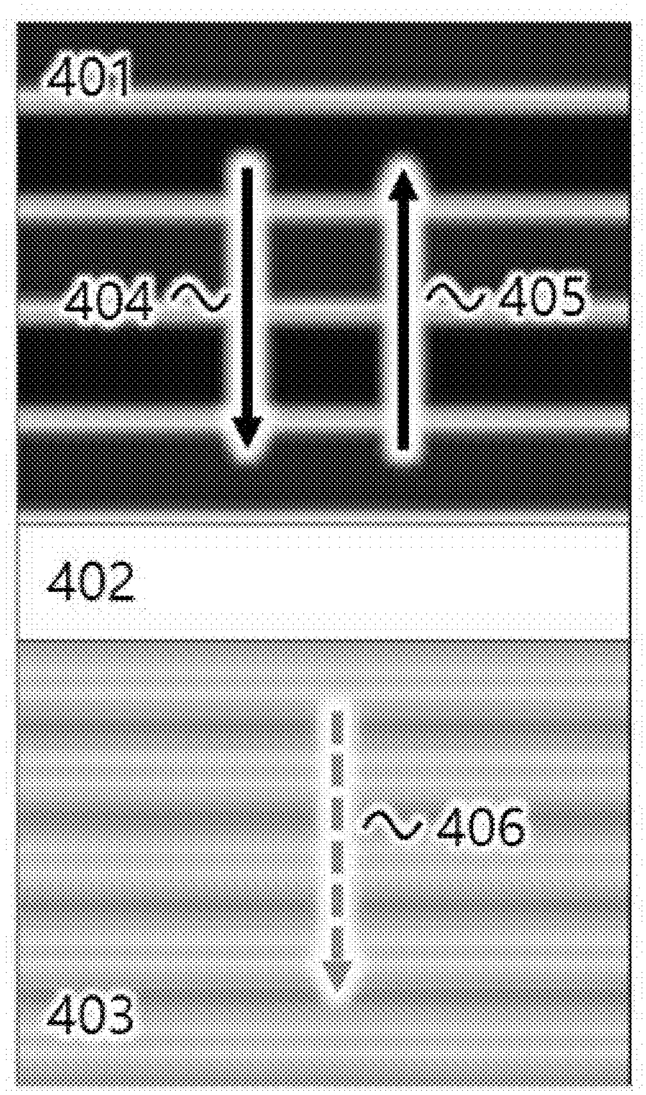
FIG. 13A is a diagram illustrating a simulation result of ultrasound transmission between an incident medium and a target medium in an environment in which an acoustic matching member is not used.
Figure 13B:
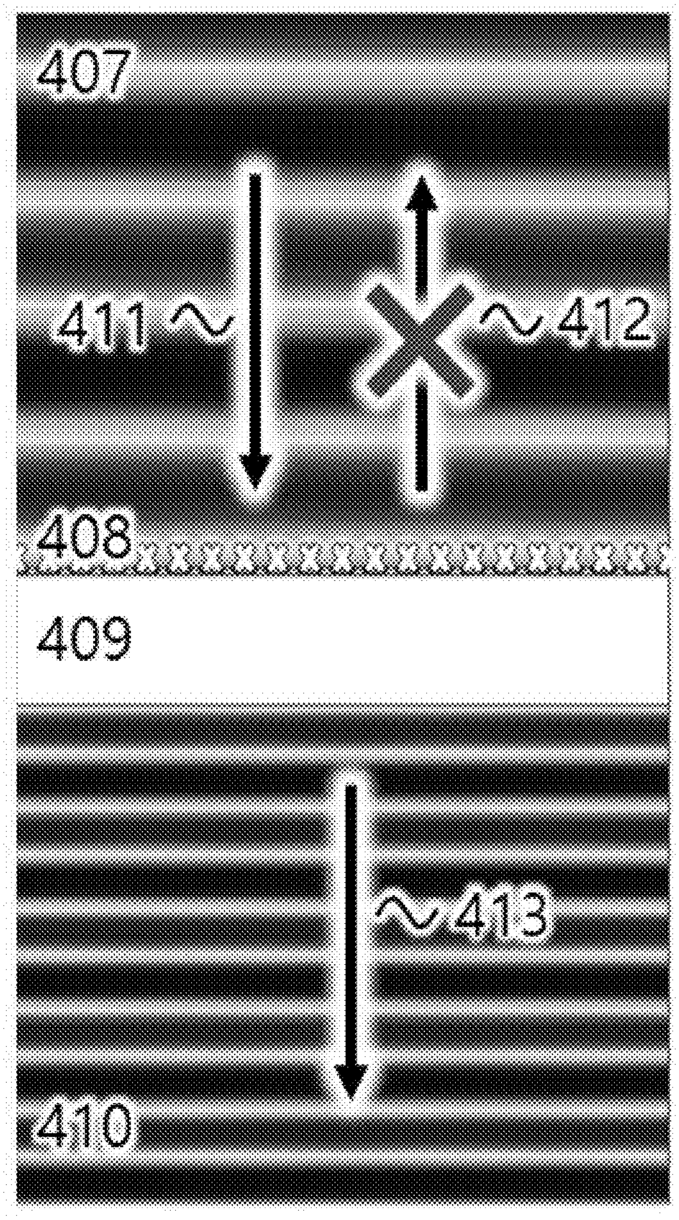
FIG. 13B is a diagram illustrating a simulation result of ultrasound transmission between a particle medium and a target medium in an environment in which an acoustic matching member according to an embodiment of the present invention is used.

In one embodiment, a design example of the acoustic matching member 101 having an X-shaped single pattern and fully penetrating an ultrasound barrier is as follows. First, if there is the same incident medium (aluminum), target medium (PEEK), and barrier (water), The design parameters of the X-shaped single pattern satisfy $L_y$=9 mm, l=5.789 mm, l=1,252 mm, l=32.524 mm $L_x$=9 mm. The variable satisfies $L_x$=9 mm, $L_y$=9 mm, l=5.789 mm, l=1,252 mm, l=32.524 mm. Based on the design variables, a full transmission phenomenon may be implemented at a target frequency of 100 kHz. FIG. 13A and FIG. 13B show the simulation analysis results according to the presence or absence of the acoustic matching member 101 at a target frequency of 100 kHz. When there is no acoustic matching member 101 of the present invention, the ultrasound transmittance is only about 14%, and the simulation analysis result for this is shown in FIG. 13A as below. On the other hand, when the acoustic matching member 101 proposed in the present invention is placed in a barrier shear, for example, between aluminum and water, full transmission of ultrasound (transmittance 100%) is realized, and the simulation analysis results for this are shown in FIG. 13B below.

FIG. 13A is a diagram illustrating a simulation result of ultrasound transmission between a particle medium and a target medium in an environment in which an acoustic matching member is not used, and FIG. 13B is a diagram illustrating a simulation result of ultrasound transmission between a particle medium and a target medium in an environment in which an acoustic matching member according to an embodiment of the present invention is used.

Referring to FIG. 13A, when only the barrier 402 is placed between the incident medium 401 and the target medium 403, a normalized displacement amplitude field of ultrasound is indicated as a square root of the impedance ratio between the incident medium 401 and the target medium 403. At this time, it may be confirmed that a considerable amount of energy of the incident wave 404 is reflected 405 into the incident medium due to a barrier having a large impedance difference, and only a portion of the energy is transmitted 406.

Referring to FIG. 13B, when the acoustic matching members 101 and 408 are disposed between the barrier front, for example, aluminum and water, a normalized displacement amplitude field of the ultrasound is indicated as a square root of the impedance ratio of the incident medium 407 and the target medium 410. At this time, it may be seen that reflection 412 of the incident wave 411 into the incident medium hardly occurs due to the barrier 409, and almost all of the incident energy is transmitted 413 into the target medium.

Therefore, the acoustic matching members 101, 205, and 408 of the present invention may be used to expand use range of existing ultrasound equipment or to develop new high-efficiency wave equipment. In particular, it may be directly used for ultrasound treatment, diagnosis, imaging, or industrial ultrasound non-destructive testing which requires high-energy ultrasound transmission in an environment with barriers.

Figure 14:
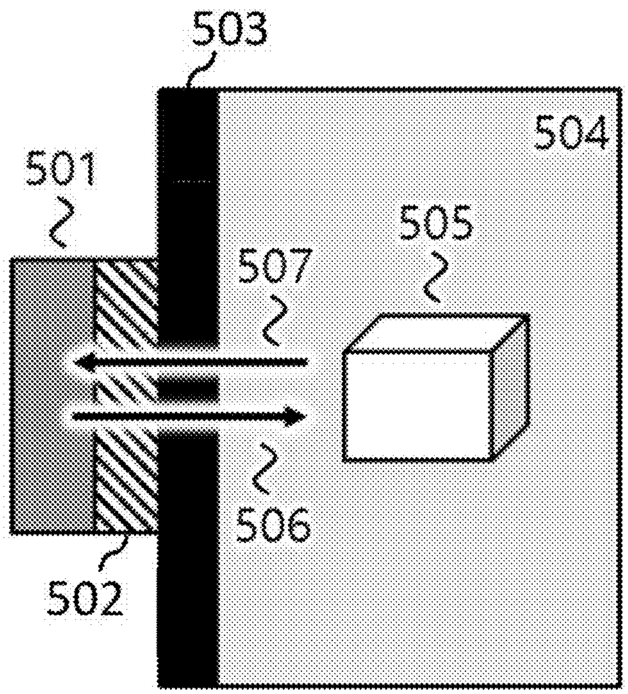
FIG. 14 is a diagram explaining a method for imaging an object to be measured by using an ultrasound transducer according to an embodiment of the present invention.
Figure 15:
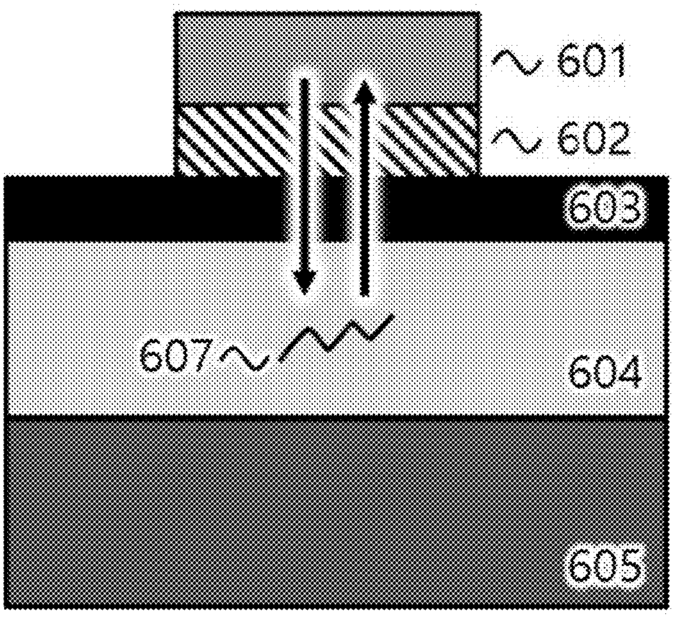
FIG. 15 is a diagram explaining a method for measuring a defect of a target to be measured by using an ultrasound non-destructive testing apparatus according to an embodiment of the present invention.
Figure 16:
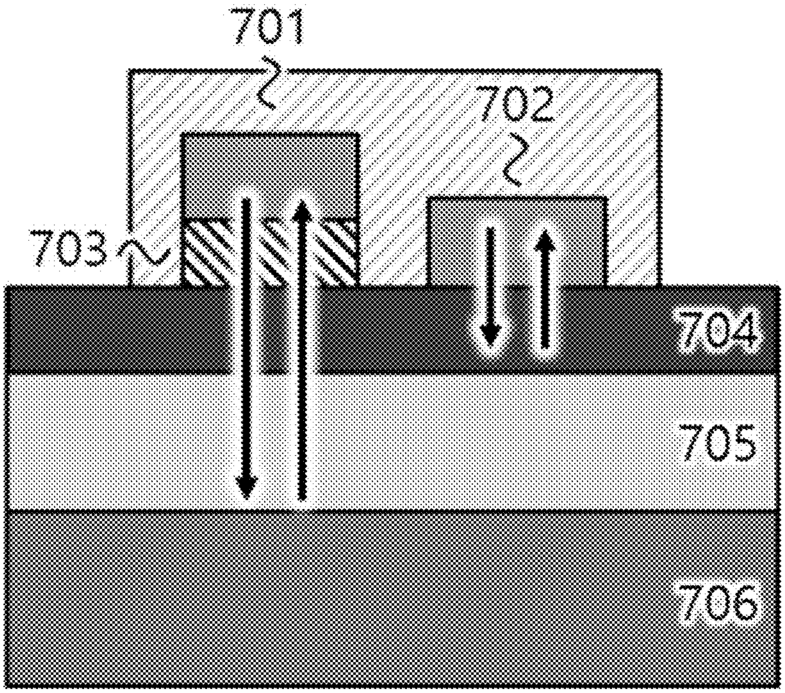
FIG. 16 is a diagram explaining a method for measuring the thickness of a thin film by using an acoustic matching member for a thin film measuring according to an embodiment of the present invention.

As described above, if the acoustic matching members 101, 205, and 408 of the present invention are used, it is possible to sense or image a target beyond the partition wall. In the prior art, since it is difficult to detect or image an object beyond a partition wall because ultrasound of sufficient energy may not be transmitted over the partition wall. However, when the acoustic matching members 101, 205, and 408 of the present invention are used, it becomes possible to detect or image a target by using ultrasound over the partition wall since 100% of the incident energy may be transmitted to the target as shown in FIG. 14. In addition, the acoustic matching members 101, 205, and 408 of the present invention may be used to non-destructively diagnose defects of an inspection target inside multiple layers. Industrial ultrasound non-destructive testing is a technology for diagnosing defects which exist inside the inspection object by transmitting ultrasound. At this time, it is very important to transmit high energy to the inspection target without loss. However, when the inspection target is hidden by some barrier or is inside multiple layers, it is difficult to inspect because the transmittance of ultrasound is very low. When the acoustic matching members 101, 205, and 408 of the present invention are utilized, since the waves may be transmitted over barriers with 100% energy efficiency as shown in FIG. 15, the application range of non-destructive testing may be remarkably expanded. The acoustic matching members 101, 205 and 408 of the present invention may also be applied to multi-layer thin film thickness measurement. Conventional thin film thickness measurement using ultrasound is mainly used for measuring the thickness of a single layer thin film, but when using the acoustic matching members 101, 205, and 408 of the present invention, it may also be used for measuring the thickness of multiple layers as shown in FIG. 16. The acoustic matching members 101, 205, and 408 of the present invention may also be applied to multi-layer thin film thickness measurement. Conventional thin film thickness measurement using ultrasound is mainly used for measuring the thickness of a single layer thin film, but when using the acoustic matching members 101, 205, and 408 of the present invention, it may also be used for measuring the thickness of multiple layers as shown in FIG. 16.

FIG. 14 is a diagram explaining a method for imaging an object to be measured by using an ultrasound transducer according to an embodiment of the present invention.

Referring to FIG. 14, the ultrasound 506 generated from the ultrasound transducer 501 (e.g., corresponding to the incident medium) may fully penetrates the partition wall 503 through the acoustic matching members 101 and 502 of the present invention, and reach the target 505. Existence, a shape, and a position of the object 505 may be detected when the ultrasound 506 fully transmitted through the target medium 504 analyzes a signal 507 which is reflected by the target 505.

FIG. 15 is a diagram explaining a method for measuring a defect of a target to be measured by using an ultrasound non-destructive testing apparatus according to an embodiment of the present invention.

Referring to FIG. 15, when a defect 607 exists in a layer 604 located in the middle of a target to be inspected composed of multiple layers 603, 604, and 605, the defect 607 in the layer 604 may be detected by using the acoustic matching members 101 and 602 of the present invention. Specifically, when the acoustic matching members 101 and 602 of the present invention are used, as 100% of the ultrasound generated through the non-destructive testing device 601 are transmitted to the second layer 604 over the first layer 603, a defect 607 in the second layer 604 may be detected.

FIG. 16 is a diagram explaining a method for measuring the thickness of a thin film by using an acoustic matching member 101 for a thin film measuring according to an embodiment of the present invention.

Referring to FIG. 16, the thickness of a layer 705 positioned in the middle of a target to be inspected composed of multiple thin film layers 704, 705, and 706 may be measured by using acoustic matching members 101 and 703. Specifically, the first module 701 utilizes the acoustic matching members 101 and 703 to measure the total thickness between the first thin film 704 and the second thin film 705, and the second module 702 may easily measure the thin film thickness of multiple thin film layers by measuring the thickness of the first thin film.

In addition, the acoustic matching member 101 of the present invention may be used in an ultrasound probe used in a medical ultrasound treatment device and a medical ultrasound imaging device. When transmission of waves is blocked due to barriers in medical ultrasound, the treatment effects are reduced, or signal analysis is difficult. Therefore, for efficient treatment and diagnosis, it is important to transmit high-energy ultrasound to a target point without loss. For example, the skull may be a barrier in brain ultrasound treatment and imaging, and the reduced ultrasound transmittance due to the skull hinders the effectiveness or usability in brain ultrasound technology. When the acoustic matching member 101 of the present invention is used, the effects such as overcoming the decrease in transmittance due to the skull and transmitting 100% ultrasound to a target point may be expected as shown in FIG. 17.

Figure 17:
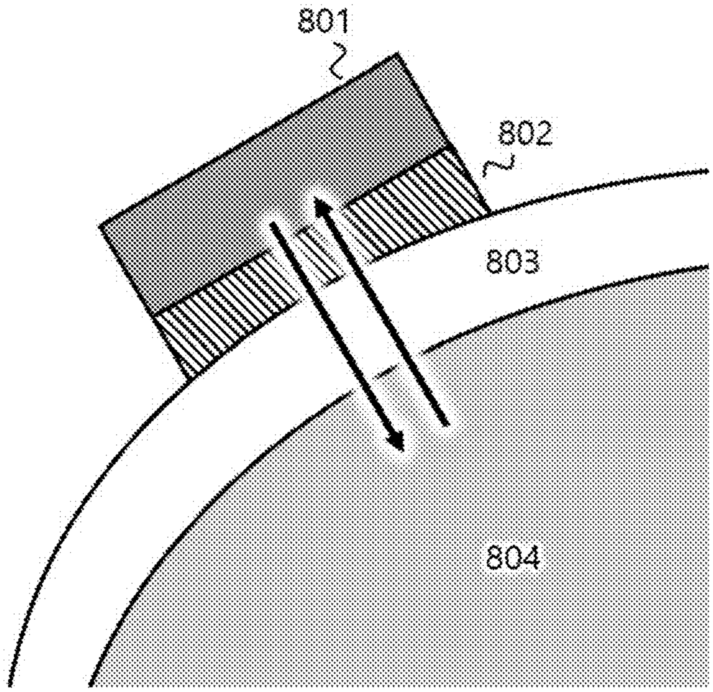
FIG. 17 is a diagram explaining a method for imaging a brain by using a probe for ultrasound diagnosis and treatment according to an embodiment of the present invention.

FIG. 17 is a diagram explaining a method for imaging a brain by using a probe for ultrasound diagnosis and treatment according to an embodiment of the present invention.

Referring to FIG. 17, ultrasound generated from an ultrasound diagnosis and treatment probe 801 (e.g., corresponding to an incident medium) may pass through the acoustic matching members 101 and 802 and the skull 803, and 100% of the waves may be conveyed to the brain 804. When high-energy ultrasound passes through the skull 803, the effects such as efficiently imaging the brain or delivering higher ultrasound energy to a region requiring treatment may be expected.

Although the present invention described a case of ultrasound of 20 kHz or higher as an example, a specific microstructure may be derived based on the above-described barrier penetration design principle even when a wide frequency band is used.

According to the embodiments of the present invention described above, the present invention relates to an acoustic matching member 101 which fully transmits ultrasound passing through a barrier when there is a barrier, and the acoustic matching member 101 may be implemented as a single X-shaped pattern having a total of five design variables, but not limited thereto. Since the acoustic matching member 101 of the present invention is designed according to a simple structure which may be easily manufactured, it may solve the problems of the prior art requiring complex and precise processing. Accordingly, there is an effect that full transmission of ultrasound which may pass through barriers may be easily implemented. In addition, when the acoustic matching member 101 of the present invention is used, full transmission may be implemented not only when the incident medium and the target medium are the same, but also when the incident medium and the target medium are different. The acoustic matching member 101 of the present invention may be applied to medical/industrial ultrasound technology which requires full transmission of ultrasound waves passing through barriers.

The present invention is a technology for fully transmitting ultrasound (i.e., 100% energy efficiency) to a target by adding an acoustic matching member 101 in front of the barrier when there is a barrier on the path of the ultrasound. When utilizing the acoustic matching member 101 of the present invention, even if there is a barrier (e.g., skull), since it is possible to overcome the barrier and transmit 100% of the ultrasound to the target (e.g., the brain), it may be actively used to increase the efficiency of ultrasound treatment devices, diagnostic devices, imaging devices, industrial ultrasound non-destructive testing equipment, and the like.

In this specification, the preferred embodiments of the present invention have been disclosed, and although specific terms have been used, they are only used in a general sense to easily explain the technological content of the present invention and to help understanding the present invention, and they are not used to limit the scope of the present invention. It is obvious to those having ordinary skill in the related art to which the present invention belongs that other modifications based on the technological idea of the present invention may be implemented in addition to the embodiments disclosed herein. It will be understood to those having ordinary skill in the related art that in connection with an acoustic matching member according to the embodiments described with reference to FIGS. 1A, 10A to 10E to 11B, 13B, and 14 to 17, a manufacturing method thereof, and an ultrasound acoustic matching member 101 including the acoustic matching member, various substitutions, changes, and modifications may be made without departing from the technological spirit of the present invention. Therefore, the scope of the invention should not be determined by the described embodiments, but should be determined by the technological concepts described in the claims.

EXPLANATION OF REFERENCE CHARACTERS

101, 205, 408, 502, 602, 703, 802: acoustic matching member

102: matching pattern

103: X-shaped single pattern (first region), 104: second area

201, 204, 407: incident medium,

203, 207, 410, 504: target medium

202, 206, 409: barrier, 501: ultrasound transducer

503: septum, 505: target

601: ultrasound non-destructive testing device

603, 604, 605: layer, 607: defect

701: first module, 702: second module

704, 705, 706: thin film layer

801: ultrasound probe, 803: skull, 804: brain

The invention claimed is:

1. An acoustic matching member for transmitting an ultrasonic wave from an incident medium (I) to a target medium (T) such that 90% or more of the ultrasonic wave is transmitted through a barrier (B) disposed between the incident medium (I) and the target medium (T), comprising:

the acoustic matching member being configured in consideration of overall acoustic wave-propagation characteristics of an I-B-T structure including an acoustic impedance ($Z_B$), a thickness ($d_B$), and a wavenumber ($k_B$) of the barrier (B), wherein an effective acoustic impedance (Z) of the acoustic matching member satisfies an impedance matching condition such that an input impedance of the I-B-T structure substantially matches an impedance of the incident medium (I), wherein a phase characteristic of an ultrasonic wave propagating through the acoustic matching member satisfies a phase change matching condition such that phase delay and phase mismatch caused by propagation through the barrier (B) are compensated, wherein the acoustic matching member includes a matching pattern designed according to the impedance matching condition and the phase change matching conditions, wherein the matching pattern has a structure in which unit structures including a single X-shaped pattern are arranged.

2. The acoustic matching member of claim 1, wherein the impedance and the phase change of the acoustic matching member are determined by at least one design variable of the matching pattern, and the design variable includes a horizontal length and a vertical length of the unit structure, and a length, radius, and a rotation angle of the X-shaped pattern.

3. The acoustic matching member of claim 1, wherein the impedance matching condition is defined by the following equation, $$Z_L = Z_B\sqrt{\frac{+\cos(d_Bk_B)^2Z_IZ_T^2 - \cos(d_Bk_B)^2Z_I^2Z_T - \sin(d_Bk_B)^2Z_I^2Z_T + \sin(d_Bk_B)^2Z_IZ_B^2}{-\cos(d_Bk_B)^2Z_IZ_B^2 + \cos(d_Bk_B)^2Z_B^2Z_T + \sin(d_Bk_B)^2Z_B^2Z_T - \sin(d_Bk_B)^2Z_IZ_T^2}}$$

where $Z_I$ is the impedance of the incident medium, $Z_T$ is the impedance of the target medium, $Z_B$ is the impedance of the barrier, $Z_L$ is the impedance of the acoustic matching member, $k_B$ is the wave number of the barrier, $k_L$ is the wave number of the acoustic matching member, $d_B$ is the thickness of the barrier, and de is the thickness of the acoustic matching member.

4. The acoustic matching member of claim 1, wherein the phase change matching condition may be defined by the following equation, $$d_L k_L = \pm\arccos\left(\frac{\pm\sin(2d_B k_B)\sqrt{Z_I}\left(Z_B^2 - Z_T^2\right)}{2\sqrt{\begin{array}{c} Z_T\left(\sin(d_B k_B)^2 Z_B^4 - 2Z_I Z_B^2 Z_T + \right. \\ \cos(d_B k_B)^2 Z_B^2 Z_T^2 + \\ \left. Z_I^2\left(\cos(d_B k_B)^2 Z_B^2 + \sin(d_B k_B)^2 Z_T^2\right)\right) \end{array}}}\right)$$

where $Z_I$ is the impedance of the incident medium, $Z_T$ is the impedance of the target medium, $Z_B$ is the impedance of the barrier, $Z_L$ is the impedance of the acoustic matching member, $k_B$ is the wave number of the barrier, $k_L$ is the wave number of the acoustic matching member, de is the thickness of the barrier, and de is the thickness of the acoustic matching member.

5. The acoustic matching member of claim 1, wherein the impedance and the phase change matching conditions are based on a destructive interference condition of reflected waves generated by multiple internal reflections occurring inside the acoustic matching member and the barrier.

6. The acoustic matching member of claim 1, wherein a first region of the matching pattern and a second region other than the matching pattern has different media or different thicknesses.

7. The acoustic matching member of claim 1 which is positioned between the incident medium and the barrier.

8. The acoustic matching member of claim 1, including a resin component, and wherein the resin component includes a polyimide resin, an epoxy resin, a glass fiber-reinforced epoxy resin, or a thermoplastic resin.

9. The acoustic matching member of claim 1, which is used in ultrasound treatment devices, diagnostic devices, imaging devices, and industrial ultrasound non-destructive testing equipment.

10. An ultrasound treatment device which operates in conjunction with the acoustic matching member of claim 1.

11. An ultrasound diagnostic device which operates in conjunction with the acoustic matching member of claim 1.

12. Ultrasound non-destructive testing equipment that operates in conjunction with the acoustic matching member of claim 1.

13. The acoustic matching member of claim 1, wherein the matching pattern has an M×N array structure, where M and N are natural numbers greater than zero.

14. The acoustic matching member of claim 1, wherein the impedance and the phase change of the acoustic matching member determine density and longitudinal stiffness ($C^{11}$) of the acoustic matching member.

* * * * *